United States Patent
Tobe et al.

(10) Patent No.: US 7,239,619 B2
(45) Date of Patent: Jul. 3, 2007

(54) MOBILE COMMUNICATION SYSTEM, BASE STATION, MOBILE STATION, AND CELL CONTROL METHOD

(75) Inventors: Hideki Tobe, Kawasaki (JP); Hidetoshi Kayama, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 843 days.

(21) Appl. No.: 10/677,431

(22) Filed: Oct. 3, 2003

(65) Prior Publication Data

US 2004/0131029 A1    Jul. 8, 2004

(30) Foreign Application Priority Data

Oct. 3, 2002    (JP) .......................... P2002-291316

(51) Int. Cl.
*H04Q 7/00*    (2006.01)

(52) U.S. Cl. ...................... 370/331; 455/436; 455/522

(58) Field of Classification Search ................ 370/328, 370/331–333; 455/436, 522, 550.1, 561
See application file for complete search history.

(56) References Cited

U.S. PATENT DOCUMENTS

| | | | |
|---|---|---|---|
| 5,487,174 A * | 1/1996 | Persson | 455/444 |
| 5,898,682 A | 4/1999 | Kanai | |
| 6,366,778 B1 * | 4/2002 | Bender et al. | 455/442 |
| 6,553,016 B1 * | 4/2003 | Roxbergh | 370/331 |

FOREIGN PATENT DOCUMENTS

| | | |
|---|---|---|
| EP | 1 018 809 | 7/2000 |
| EP | 1 058 474 | 12/2000 |

OTHER PUBLICATIONS

H. Tobe, et al., The Institute of Electronics, Information and Communication Engineeres, General Meeting 2002, B-5-70, p. 520, "Autonomous Cell Shaping Method Based on the Arrangement of Base Stations", Mar. 2002, (with English translation).

* cited by examiner

*Primary Examiner*—Nguyen T. Vo
(74) *Attorney, Agent, or Firm*—Oblon, Spivak, McClelland, Maier & Neustadt, P.C.

(57) ABSTRACT

Provided is a mobile communication system capable of reducing interference in uplinks and downlinks to achieve excellent communication quality. A mobile station receives cell selection reference signals from a first base station and a second base station to connect before and after a handover, and measures received power values of the cell selection reference signals. The mobile station acquires uplink transmitted power values from the mobile station to the first base station and to the second base station. The first base station and the second base station control a power of the cell selection reference signal so that the uplink transmitted power values from the mobile station to the first base station and to the second base station become substantially equal and so that a received power value at the mobile station of the cell selection reference signal becomes substantially equal to a predetermined reference power value.

16 Claims, 15 Drawing Sheets

Fig.3A

| BASE STATION IDENTIFIER | CELL IDENTIFIER |
|---|---|
| 1 | 4 |

Fig.3B

| BASE STATION IDENTIFIER | CELL IDENTIFIER |
|---|---|
| 2 | 1 |

Fig.4

| DESTINATION MOBILE STATION IDENTIFIER | NOTIFICATION INFORMATION |
|---|---|
| EVERY MS | END OF CHANGE |

Fig.5A

| BASE STATION IDENTIFIER | CELL IDENTIFIER INFORMATION | DESTINATION BS UPLINK TRANSMITTED POWER VALUE | OTHER BS UPLINK TRANSMITTED POWER VALUE | CELL SELECTION REFERENCE RECEIVED POWER VALUE |
|---|---|---|---|---|
| 1 | 4 | P1 | P2 | R1 |

Fig.5B

| BASE STATION IDENTIFIER | CELL IDENTIFIER INFORMATION | DESTINATION BS UPLINK TRANSMITTED POWER VALUE | OTHER BS UPLINK TRANSMITTED POWER VALUE | CELL SELECTION REFERENCE RECEIVED POWER VALUE |
|---|---|---|---|---|
| 2 | 1 | P2 | P1 | R2 |

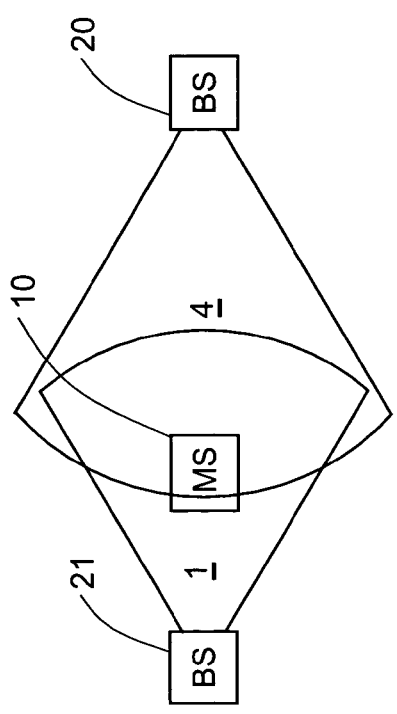
Fig.7A
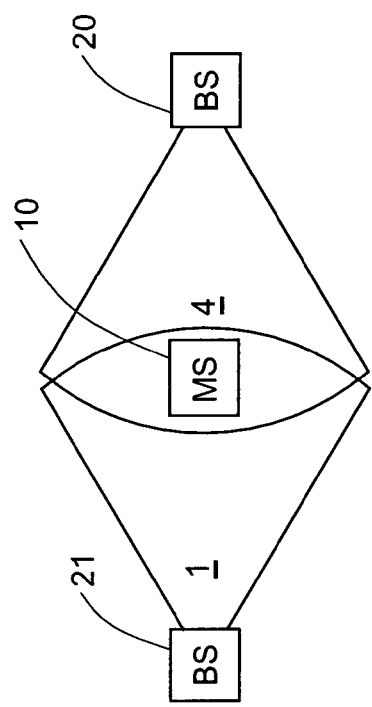
Fig.7B
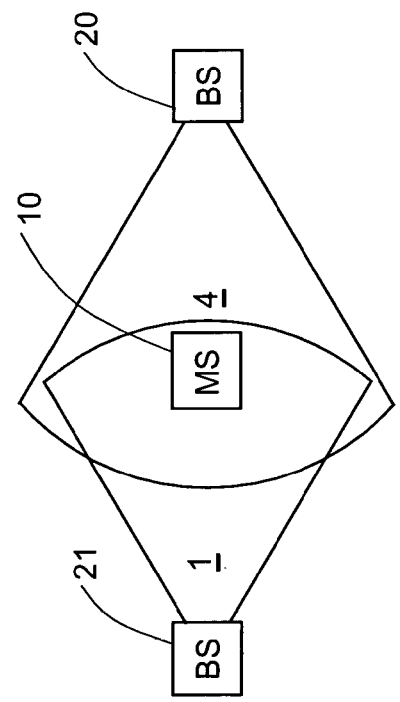
Fig.7D
Fig.7C

*Fig.13*

| BASE STATION IDENTIFIER | CELL IDENTIFIER INFORMATION | CELL CHANGE INFORMATION |
|---|---|---|
| 1 | 4 | INCREASE |

MOBILE COMMUNICATION SYSTEM, BASE STATION, MOBILE STATION, AND CELL CONTROL METHOD

BACKGROUND OF THE INVENTION

1. Field of the Invention

The present invention relates to a mobile communication system, a base station, a mobile station, and a cell control method.

2. Related Background Art

In a mobile communication system, a plurality of base stations establish cells by broadcasting their respective cell selection reference signals. There are also cases where each base station broadcasts directional cell selection reference signals in multiple directions to establish multiple sector cells (such sector cells will also be referred to as "cells" in the present specification).

The size of each cell is determined by a transmitted power of a cell selection reference signal from a base station. Namely, the size of each cell is defined by the size of an area in which the cell selection reference signal reaches at a predetermined power value. A mobile station establishes a connection for communication with a base station from which it can receive the cell selection reference signal at a maximum intensity.

When a new base station is added in such a mobile communication system, a neighboring base station notifies the new base station of a transmitted power value of the cell selection reference signal broadcast thereby. The new base station also measures a received power value of the cell selection reference signal transmitted from the neighboring base station. The new base station calculates a propagation loss of the cell selection reference signal from the neighboring base station, using the transmitted power value notified of by the neighboring base station, and the received power value measured. The new base station estimates the cell boundary of the neighboring base station from the calculated propagation loss and controls the transmitted power value of the cell selection reference signal broadcasted by itself, according to the estimated cell boundary. This permits the new base station to autonomously adjust the size of the cell established by itself (for example, reference is made to Hideki Fujibe et al., "Proposal on autonomous cell formation based on arrangement of base stations," The 2002 IEICE General Conference, B-5-70, Mar. 2002, p520).

SUMMARY OF THE INVENTION

In the case where the new base station is added, however, the size of the cell of the new base station is determined according to the boundary of the cell previously established by the neighboring base station, so that the sizes of the cells established by the respective base stations will differ.

Let us suppose herein that there are two cells established by a base station forming a cell of a large size and a base station forming a cell of a small size adjacent thereto and they overlap each other in the vicinity of the boundary between them. When a mobile station is located in the cell overlapping region and is connected to the base station forming the cell of the large cell, a transmitted power of an uplink from the mobile station to the base station becomes high, because the distance is long to the base station. Accordingly, the radio wave from the mobile station induces interference with the base station forming the cell of the small size, so as to degrade the quality of communication in the uplink.

In order to alleviate the interference in the uplink as described above, if the size of the cell of the base station newly installed is set equal to the size of the cell already established by the neighboring base station, it will result in increasing the overlapping area of the cells established by the both base stations. In this case, interference will degrade the quality of communication in the downlink from the base station to the mobile station.

The conventional mobile communication systems suffer the degradation of the communication quality, while permitting the autonomous adjustment of the cell size at the base station, as described above, and there are thus desires for a mobile communication system improved in the quality of communication.

An object of the present invention is therefore to provide a mobile communication system, a base station, a mobile station, and a cell control method capable of reducing the interference in the uplink from the mobile station to the neighboring base station and the interference in the downlink from the neighboring base station to the mobile station and thereby achieving excellent quality of communication.

In order to achieve the above object, a mobile communication system according to the present invention is a mobile communication system comprising a mobile station and a plurality of base stations, wherein the mobile station comprises: cell selection reference receiving means for, on the occasion of a handover from a first base station to a second base station as a base station for the mobile station to be connected, receiving a first cell selection reference signal from the first base station and a second cell selection reference signal from the second base station out of cell selection reference signals broadcasted by the respective base stations, each cell selection reference signal containing identification information for identification of a base station and a cell established by the base station; cell selection reference received power measuring means for measuring received power values of the first and second cell selection reference signals received by the cell selection reference receiving means; uplink transmitted power acquiring means for acquiring a first uplink transmitted power value and a second uplink transmitted power value, which are transmitted powers of respective uplinks from the mobile station to the first base station and to the second base station; and cell control information transmitting means for transmitting to the first base station, first cell control information based on at least the received power value of the first cell selection reference signal, the first and second uplink transmitted power values, and the first identification information included in the first cell selection reference signal, and for transmitting to the second base station, second cell control information based on at least the received power value of the second cell selection reference signal, the first and second uplink transmitted power values, and the second identification information included in the second cell selection reference signal; and wherein each of the base stations comprises: cell selection reference broadcasting means for broadcasting the cell selection reference signal; and cell controlling means for acquiring the cell control information transmitted to the relevant base station by the cell control information transmitting means of the mobile station and for, based on the cell control information, controlling a power of the cell selection reference signal broadcasted by the cell selection reference broadcasting means into the cell established by the relevant base station specified by the identification information in the cell control information, so that the first and second uplink transmitted power values become substantially equal and so that a received power value at the mobile station of the cell selection reference signal broadcasted by the relevant base station becomes substantially equal to a predetermined reference power value.

In order to achieve the above object, a base station according to the present invention is the above base station in the mobile communication system, which comprises: cell selection reference broadcasting means for broadcasting a cell selection reference signal containing identification information for identification of the base station and a cell established by the base station; and cell controlling means configured as follows: in the case of the relevant base station being one of a first base station and a second base station for a mobile station to be connected before and after a handover, the cell controlling means acquires one cell control information out of first cell control information transmitted to the first base station by the mobile station on the basis of at least a received power value at the mobile station of the cell selection reference signal broadcasted by the first base station, first and second uplink transmitted power values from the mobile station to the first base station and to the second base station, and first identification information in the first cell selection reference signal, and second cell control information transmitted to the second base station by the mobile station on the basis of at least a received power value at the mobile station of the cell selection reference signal broadcasted by the second base station, the first and second uplink transmitted power values, and second identification information in the second cell selection reference signal; and the cell controlling means controls a power of the cell selection reference signal broadcasted by the cell selection reference broadcasting means into the cell established by the relevant base station specified by the identification information in the one cell control information, so that the first and second uplink transmitted power values become substantially equal and so that the received power value at the mobile station of the cell selection reference signal broadcasted by the relevant base station becomes substantially equal to a predetermined reference power value, based on the one cell control information.

In order to achieve the above object, a mobile station according to the present invention is the above mobile station in the mobile communication system comprising a plurality of base stations, the mobile station comprising: cell selection reference receiving means for, on the occasion of a handover from a first base station to a second base station as a base station for the mobile station to be connected, receiving a first cell selection reference signal from the first base station and a second cell selection reference signal from the second base station out of cell selection reference signals broadcasted by the respective base stations, each cell selection reference signal containing identification information for identification of a base station and a cell established by the base station; cell selection reference received power measuring means for measuring received power values of the first and second cell selection reference signals received by the cell selection reference receiving means; uplink transmitted power acquiring means for acquiring a first uplink transmitted power value and a second uplink transmitted power value, which are transmitted powers of respective uplinks from the mobile station to the first base station and to the second base station; and cell control information transmitting means for transmitting to the first base station, first cell control information based on at least the received power value of the first cell selection reference signal, the first and second uplink transmitted power values, and the first identification information included in the first cell selection reference signal, and for transmitting to the second base station, second cell control information based on at least the received power value of the second cell selection reference signal, the first and second uplink transmitted power values, and the second identification information included in the second cell selection reference signal.

In order to achieve the above object, a cell control method according to the present invention is a cell control method of controlling cells established by respective base stations, the cell control method comprising: a cell selection reference broadcasting step wherein cell selection reference broadcasting means of each of the base stations broadcasts a cell selection reference signal containing identification information for identification of the base station and a cell established by the base station; a cell selection reference signal receiving step wherein, on the occasion of a handover from a first base station to a second base station as a base station for a mobile station to be connected, cell selection reference receiving means of the mobile station receives a first cell selection reference signal from the first base station and a second cell selection reference signal from the second base station out of the cell selection reference signals broadcasted by the respective base stations; a cell selection reference received power measuring step wherein cell selection reference received power measuring means of the mobile station measures received power values of the first and second cell selection reference signals received by the cell selection reference receiving means; an uplink transmitted power acquiring step wherein uplink transmitted power acquiring means of the mobile station acquires a first uplink transmitted power value and a second uplink transmitted power value, which are transmitted powers of respective uplinks from the mobile station to the first base station and to the second base station; a cell control information transmitting step wherein cell control information transmitting means of the mobile station transmits to the first base station, first cell control information based on at least the received power value of the first cell selection reference signal, the first and second uplink transmitted power values, and the first identification information included in the first cell selection reference signal, and transmits to the second base station, second cell control information based on at least the received power value of the second cell selection reference signal, the first and second uplink transmitted power values, and the second identification information included in the second cell selection reference signal; and a cell control step wherein cell controlling means of each of the base stations acquires the cell control information transmitted to the relevant base station by the cell control information transmitting means of the mobile station and, based on the cell control information, controls a power of the cell selection reference signal broadcasted by the cell selection reference broadcasting means into the cell established by the relevant base station specified by the identification information in the cell control information, so that the first and second uplink transmitted power values become substantially equal and so that a received power value at the mobile station of the cell selection reference signal broadcasted by the relevant base station becomes substantially equal to a predetermined reference power value.

According to these aspects of the invention, each base station broadcasts the cell selection reference signal containing the identification information for identification of the base station itself and the cell established by the base station, into the cell established by the base station. On the occasion of a handover in which the mobile station switches its connected base station from a first base station to a second base station among such base stations, the mobile station receives the first cell selection reference signal broadcasted by the first base station and the second cell selection reference signal broadcasted by the second base station. The mobile station measures the received power values of the first and second cell selection reference signals. The mobile station acquires the uplink transmitted power value to the first base station and the uplink transmitted power value to the second base station. The mobile station transmits the first cell control information based on at least the received power value of the first cell selection reference signal, the first and second uplink transmitted power values, and the first identification information in the first cell selection reference signal, to the first base station. The mobile station transmits the second cell control information based on at least the received power value of the second cell selection reference signal, the first and second uplink transmitted power values, and the second identification information in the second cell selection reference signal, to the second base station. When the base station is one corresponding to the first base station or the second base station, it acquires the above cell control information transmitted by the mobile station. The base station specifies the cell established by itself, with reference to the identification information included in the cell control information. Based on this cell control information, the base station controls the power of the cell selection reference signal broadcasted into the specified cell so that the uplink transmitted power values of the first uplink transmitted power value and the second uplink transmitted power value become substantially equal and so that the received power value at the mobile station of the cell selection reference signal broadcasted by the base station becomes substantially equal to the predetermined reference power value. The cells established by the base stations connected to the mobile station before and after the handover overlap each other at the location where the mobile station is located. The base stations connected to the mobile station before and after the handover control the powers of the cell selection reference signals broadcasted into their respective cells so that the uplink transmitted powers from the mobile station to the respective base stations become substantially equal, whereby the radii of the cells of the respective base stations can be made substantially equal. Each of the base stations connected to the mobile station before and after the handover controls the power of the cell selection reference signal so that the received power value of the cell selection reference signal measured at the mobile station becomes substantially equal to the predetermined reference power value, whereby the overlapping region of the above cells can be adjusted. As a result, it becomes feasible to achieve excellent quality of communication while reducing the interference in the uplink from the mobile station to the neighboring base station and the interference in the downlink from the neighboring base station to the mobile station.

In the mobile communication system of the present invention, preferably, each of the base stations establishes a plurality of cells, and the cell selection reference broadcasting means of the base station broadcasts into each cell established by the relevant base station, the cell selection reference signal containing the identification information with a base station identifier for identification of the base station and a cell identifier for identification of the cell.

Preferably, the base station of the present invention establishes a plurality of cells, and the cell selection reference broadcasting means broadcasts into each cell established by the base station, the cell selection reference signal containing the identification information with a base station identifier for identification of the base station and a cell identifier for identification of the cell.

In the cell control method of the present invention, preferably, each of the base stations establishes a plurality of cells, and in the cell selection reference broadcasting step, the cell selection reference broadcasting means of the relevant base station broadcasts into each cell established by the base station, the cell selection reference signal containing the identification information with a base station identifier for identification of the base station and a cell identifier for identification of the cell.

According to these aspects of the invention, a base station establishes a plurality of cells, i.e., a plurality of sector cells of sector divisional shape. The base station broadcasts into the plurality of cells, the individual cell selection reference signals each containing the identification information with the base station identifier for identification of the base station itself and the cell identification for identification of each cell. The mobile station receives the above cell selection reference signals from the respective base stations connected before and after the handover, and notifies each of the base stations of the above cell control information. The base station, acquiring this cell control information, is able to independently control each of the sizes of the cells established by itself, with reference to the cell identifier in the cell control information.

In the mobile communication system of the present invention, preferably, the cell control information transmitting means of the mobile station transmits to the first base station the first cell control information containing the received power value of the first cell selection reference signal, the first and second uplink transmitted power values, and the first identification information and transmits to the second base station the second cell control information containing the received power value of the second cell selection reference signal, the first and second uplink transmitted power values, and the second identification information.

In the base station of the present invention, preferably, in the case of the base station being one of the first and second base stations, the cell controlling means acquires one cell control information out of the first cell control information containing the received power value of the first cell selection reference signal, the first and second uplink transmitted power values, and the first identification information and transmitted to the first base station by the mobile station, and the second cell control information containing the received power value of the second cell selection reference signal, the first and second uplink transmitted power values, and the second identification information and transmitted to the second base station by the mobile station.

In the mobile station of the present invention, preferably, the cell control information transmitting means transmits to the first base station the first cell control information containing the received power value of the first cell selection reference signal, the first and second uplink transmitted power values, and the first identification information and transmits to the second base station the second cell control information containing the received power value of the second cell selection reference signal, the first and second uplink transmitted power values, and the second identification information.

In the cell control method of the present invention, preferably, in the cell control information transmitting step, the cell control information transmitting means of the mobile station transmits to the first base station the first cell control information containing the received power value of the first cell selection reference signal, the first and second uplink transmitted power values, and the first identification information and transmits to the second base station the second cell control information containing the received power value of the second cell selection reference signal, the first and second uplink transmitted power values, and the second identification information.

According to these aspects of the invention, the mobile station transmits to the first base station the first cell control information containing the received power value of the first cell selection reference signal, the first and second uplink transmitted power values, and the first identification information. The mobile station transmits to the second base station the second cell control information containing the received power value of the second cell selection reference signal, the first and second uplink transmitted power values, and the second identification information. Therefore, the base station corresponding to the first base station or the second base station can control the power of the cell selection reference signal broadcasted into the cell established by itself, as described above, by receiving the cell control information. Namely, the base station corresponding to the first base station or the second base station adjusts the power of the cell selection reference signal so that the first uplink transmitted power value and the second uplink transmitted power value in the cell control information become substantially equal, whereby the radius of the cell established by itself can be made substantially equal to the radius of the cell established by the other base station. The base station corresponding to the first base station or the second base station adjusts the power of the cell selection reference signal so that the received power value of the cell selection reference signal in the cell control information becomes substantially equal to the predetermined reference power value, whereby the overlap can be adjusted between the cell established by itself and the cell established by the other base station. As a result, it is feasible to achieve excellent quality of communication while reducing the interference in the uplink from the mobile station to the neighboring base station and the interference in the downlink from the neighboring base station to the mobile station.

In the mobile communication system of the present invention, preferably, the cell controlling means of the base station is configured as follows: in the case of the relevant base station being one of the first and second base stations, based on the cell control information transmitted by the cell control information transmitting means of the mobile station, the cell controlling means decreases by a predetermined amount the power of the cell selection reference signal broadcasted by the cell selection reference broadcasting means into the cell established by the relevant base station specified by the identification information in the cell control information when it is determined that the uplink transmitted power value to the relevant base station out of the first and second uplink transmitted power values is larger than the uplink transmitted power value to the other base station out of the first and second uplink transmitted power values and that the received power value at the mobile station of the cell selection reference signal transmitted by the relevant base station is larger than the predetermined reference power value; and the cell controlling means increases by a predetermined amount the power of the cell selection reference signal broadcasted by the cell selection reference broadcasting means into the cell established by the relevant base station specified by the identification information in the cell control information when it is determined that the uplink transmitted power value to the relevant base station out of the first and second uplink transmitted power values is smaller than the uplink transmitted power value to the other base station out of the first and second uplink transmitted power values and that the received power value at the mobile station of the cell selection reference signal transmitted by the relevant base station is not more than the predetermined reference power value.

In the base station of the present invention, preferably, the cell controlling means is configured as follows: in the case of the base station being one of the first and second base stations, based on the cell control information transmitted by the mobile station, the cell controlling means decreases by a predetermined amount the power of the cell selection reference signal broadcasted by the cell selection reference broadcasting means into the cell established by the relevant base station specified by the identification information in the cell control information when it is determined that the uplink transmitted power value to the relevant base station out of the first and second uplink transmitted power values is larger than the uplink transmitted power value to the other base station out of the first and second uplink transmitted power values and that the received power value at the mobile station of the cell selection reference signal transmitted by the relevant base station is larger than the predetermined reference power value; and the cell controlling means increases by a predetermined amount the power of the cell selection reference signal broadcasted by the cell selection reference broadcasting means into the cell established by the relevant base station specified by the identification information in the cell control information when it is determined that the uplink transmitted power value to the relevant base station out of the first and second uplink transmitted power values is smaller than the uplink transmitted power value to the other base station out of the first and second uplink transmitted power values and that the received power value at the mobile station of the cell selection reference signal transmitted by the relevant base station is not more than the predetermined reference power value.

In the cell control method of the present invention, preferably, in the cell control step, the cell controlling means of the base station is configured as follows: in the case of the relevant base station being one of the first and second base stations, based on the cell control information transmitted by the cell control information transmitting means of the mobile station, the cell controlling means decreases by a predetermined amount the power of the cell selection reference signal broadcasted by the cell selection reference broadcasting means into the cell established by the relevant base station specified by the identification information in the cell control information when it is determined that the uplink transmitted power value to the relevant base station out of the first and second uplink transmitted power values is larger than the uplink transmitted power value to the other base station out of the first and second uplink transmitted power values and that the received power value at the mobile station of the cell selection reference signal transmitted by the relevant base station is larger than the predetermined reference power value; and the cell controlling means increases by a predetermined amount the power of the cell selection reference signal broadcasted by the cell selection reference broadcasting means into the cell established by the relevant base station specified by the identification information in the cell control information when it is determined that the uplink transmitted power value to the relevant base station out of the first and second uplink transmitted power values is smaller than the uplink transmitted power value to the other base station out of the first and second uplink transmitted power values and that the received power value at the mobile station of the cell selection reference signal transmitted by the relevant base station is not more than the predetermined reference power value.

According to these aspects of the invention, the base station corresponding to one of the first and second base stations acquires the cell control information transmitted by the mobile station. The base station corresponding to one of the first and second base stations refers to the acquired cell control information, and decreases by the predetermined amount the power of the cell selection reference signal broadcasted into the cell established by the relevant base station specified by the identification information in the cell control information when it is determined that the uplink transmitted power value to the relevant base station is larger than the uplink transmitted power value to the other base station and that the received power value at the mobile station of the cell selection reference signal transmitted by the relevant base station is larger than the predetermined reference power value. Conversely, when the uplink transmitted power value to the relevant base station is smaller than the uplink transmitted power value to the other base station and when the received power value at the mobile station of the cell selection reference signal transmitted by the relevant base station is not more than the predetermined reference power value, the base station increases by the predetermined amount the power of the cell selection reference signal broadcasted into the cell established by the relevant base station specified by the identification information in the cell control information. Each of the base stations connected to the mobile station before and after the handover increases or decreases the power of the cell selection reference signal broadcasted into its cell, based on the cell control information transmitted from the mobile station as described above. This permits the base stations connected to the mobile station before and after the handover to equalize the sizes of the respective cells and adjust the overlap of the cells. As a result, it is feasible to achieve excellent quality of communication while reducing the interference in the uplink from the mobile station to the neighboring base station and the interference in the downlink from the neighboring base station to the mobile station.

In the mobile communication system of the present invention, preferably, the cell control information transmitting means of the mobile station transmits to the first base station the first cell control information containing a first received power value difference being a difference between the predetermined reference power value and the received power value of the first cell selection reference signal, a transmitted power value difference about a difference between the first uplink transmitted power value and the second uplink transmitted power value, and the first identification information, and transmits to the second base station the second cell control information containing a second received power value difference being a difference between the predetermined reference power value and the received power value of the second cell selection reference signal, the transmitted power value difference, and the second identification information; and the cell controlling means of the base station is configured as follows: in the case of the relevant base station being one of the first and second base stations, based on the cell control information transmitted by the cell control information transmitting means of the mobile station, the cell controlling means controls the power of the cell selection reference signal broadcasted by the cell selection reference broadcasting means into the cell established by the relevant base station specified by the identification information in the cell control information, so that the transmitted power value difference falls within a first predetermined range and so that the received power value difference, which is a difference between the predetermined reference power value and the received power value at the mobile station of the cell selection reference signal broadcasted by the relevant base station, falls within a second predetermined range.

In the base station of the present invention, preferably, the cell controlling means acquires one cell control information out of the first cell control information containing a first received power value difference being a difference between the predetermined reference power value and the received power value of the first cell selection reference signal, a transmitted power value difference about a difference between the first uplink transmitted power value and the second uplink transmitted power value, and the first identification information and transmitted to the first base station by the mobile station, and the second cell control information containing a second received power value difference being a difference between the predetermined reference power value and the received power value of the second cell selection reference signal, the transmitted power value difference, and the second identification information and transmitted to the second base station by the mobile station.

In the mobile station of the present invention, preferably, the cell control information transmitting means transmits to the first base station the first cell control information containing a first received power value difference being a difference between the predetermined reference power value and the received power value of the first cell selection reference signal, a transmitted power value difference about a difference between the first uplink transmitted power value and the second uplink transmitted power value, and the first identification information, and transmits to the second base station the second cell control information containing a second received power value difference being a difference between the predetermined reference power value and the received power value of the second cell selection reference signal, the transmitted power value difference, and the second identification information.

In the cell control method of the present invention, preferably, in the cell control information transmitting step, the cell control information transmitting means of the mobile station transmits to the first base station the first cell control information containing a first received power value difference being a difference between the predetermined reference power value and the received power value of the first cell selection reference signal, a transmitted power value difference about a difference between the first uplink transmitted power value and the second uplink transmitted power value, and the first identification information, and transmits to the second base station the second cell control information containing a second received power value difference being a difference between the predetermined reference power value and the received power value of the second cell selection reference signal, the transmitted power value difference, and the second identification information; and in the cell control step, the cell controlling means of the base station is configured as follows: in the case of the relevant base station being one of the first and second base stations, based on the cell control information transmitted by the cell control information transmitting means of the mobile station, the cell controlling means controls the power of the cell selection reference signal broadcasted by the cell selection reference broadcasting means into the cell established by the relevant base station specified by the identification information in the cell control information, so that the transmitted power value difference falls within a first predetermined range and so that the received power value difference, which is a difference between the predetermined reference power value and the received power value at the mobile station of the cell selection reference signal broadcasted by the relevant base station, falls within a second predetermined range.

According to these aspects of the invention, the mobile station transmits the first cell control information containing the first received power value difference being the difference between the predetermined reference power value and the received power value of the first cell selection reference signal, the transmitted power value difference about the difference between the first uplink transmitted power value and the second uplink transmitted power value, and the first identification information to the first base station, i.e., one of the base stations connected before and after the handover. The mobile station also transmits the second cell control information containing the second received power value difference being the difference between the predetermined reference power value and the received power value of the second cell selection reference signal, the above transmitted power value difference, and the second identification information to the second base station, i.e., the other of the base stations connected before and after the handover. The base station corresponding to the first or second base station acquires the cell control information transmitted by the mobile station. Based on the acquired cell control information, the base station controls the power of the cell selection reference signal broadcasted into the cell established by the relevant base station specified by the identification information in the above cell control information so that the difference between the uplink transmitted power value from the mobile station to the relevant base station and the uplink transmitted power value to the other base station falls within the first predetermined range and so that the difference between the received power value at the mobile station of the cell selection reference signal broadcasted by the relevant base station, and the predetermined reference power value falls within the second predetermined range. As a result, the base station corresponding to the first base station or the second base station can make the radius of the cell established by itself substantially equal to the radius of the cell established by the other base station. It is also feasible to adjust the overlap between the cell established by the relevant base station and the cell established by the other base station. This makes it feasible to achieve excellent quality of communication while reducing the interference in the uplink from the mobile station to the neighboring base station and the interference in the downlink from the neighboring base station to the mobile station. Furthermore, since the cell control information transmitted from the mobile station to the base stations is comprised of the information based on the differences, the volume of the cell control information is lower than that in the aforementioned aspects of the invention.

In the mobile communication system of the present invention, preferably, the cell controlling means of the base station is configured as follows: in the case of the relevant base station being one of the first and second base stations, the cell controlling means acquires the cell control information transmitted by the cell control information transmitting means of the mobile station; when it is determined that the uplink transmitted power value to the relevant base station is larger than the uplink transmitted power value to the other base station out of the first and second uplink transmitted power values, based on the transmitted power value difference in the cell control information, and that the received power value at the mobile station of the cell selection reference signal transmitted by the relevant base station is larger than the predetermined reference power value, based on the received power value difference in the cell control information, the cell controlling means decreases by a predetermined amount the power of the cell selection reference signal broadcasted by the cell selection reference broadcasting means into the cell established by the relevant base station specified by the identification information in the cell control information; and when it is determined that the uplink transmitted power value to the relevant base station is smaller than the uplink transmitted power value to the other base station out of the first and second uplink transmitted power values, based on the transmitted power value difference in the cell control information, and that the received power value at the mobile station of the cell selection reference signal transmitted by the relevant base station is not more than the predetermined reference power value, based on the received power value difference in the cell control information, the cell controlling means increases by a predetermined amount the power of the cell selection reference signal broadcasted by the cell selection reference broadcasting means into the cell established by the relevant base station specified by the identification information in the cell control information.

In the base station of the present invention, preferably, the cell controlling means is configured as follows: in the case of the base station being one of the first and second base stations, the cell controlling means acquires the cell control information transmitted by the cell control information transmitting means of the mobile station; when it is determined that the uplink transmitted power value to the relevant base station is larger than the uplink transmitted power value to the other base station out of the first and second uplink transmitted power values, based on the transmitted power value difference in the cell control information, and that the received power value at the mobile station of the cell selection reference signal transmitted by the relevant base station is larger than the predetermined reference power value, based on the received power value difference in the cell control information, the cell controlling means decreases by a predetermined amount the power of the cell selection reference signal broadcasted by the cell selection reference broadcasting means into the cell established by the relevant base station specified by the identification information in the cell control information; and when it is determined that the uplink transmitted power value to the relevant base station is smaller than the uplink transmitted power value to the other base station out of the first and second uplink transmitted power values, based on the transmitted power value difference in the cell control information, and that the received power value at the mobile station of the cell selection reference signal transmitted by the relevant base station is not more than the predetermined reference power value, based on the received power value difference in the cell control information, the cell controlling means increases by a predetermined amount the power of the cell selection reference signal broadcasted by the cell selection reference broadcasting means into the cell established by the relevant base station specified by the identification information in the cell control information.

In the cell control method of the present invention, preferably, in the cell control step, the cell controlling means of the base station is configured as follows: in the case of the relevant base station being one of the first and second base stations, the cell controlling means acquires the cell control information transmitted by the cell control information transmitting means of the mobile station; when it is determined that the uplink transmitted power value to the relevant base station is larger than the uplink transmitted power value to the other base station out of the first and second uplink transmitted power values, based on the transmitted power value difference in the cell control information, and that the received power value at the mobile station of the cell selection reference signal transmitted by the relevant base station is larger than the predetermined reference power value, based on the received power value difference in the cell control information, the cell controlling means decreases by a predetermined amount the power of the cell selection reference signal broadcasted by the cell selection reference broadcasting means into the cell established by the relevant base station specified by the identification information in the cell control information; and when it is determined that the uplink transmitted power value to the relevant base station is smaller than the uplink transmitted power value to the other base station out of the first and second uplink transmitted power values, based on the transmitted power value difference in the cell control information, and that the received power value at the mobile station of the cell selection reference signal transmitted by the relevant base station is not more than the predetermined reference power value, based on the received power value difference in the cell control information, the cell controlling means increases by a predetermined amount the power of the cell selection reference signal broadcasted by the cell selection reference broadcasting means into the cell established by the relevant base station specified by the identification information in the cell control information.

According to these aspects of the invention, the base station corresponding to the first or second base station, i.e., one of the base stations connected to the mobile station before and after the handover acquires the cell control information transmitted by the mobile station. The cell control information contains the transmitted power value difference about the difference between the first uplink transmitted power value and the second uplink transmitted power value, i.e., the difference between the uplink transmitted power values from the mobile station to the respective base stations connected before and after the handover. The cell control information also contains the power value difference based on the difference between the predetermined reference power value and the received power value at the mobile station of the cell selection reference signal transmitted from the relevant base station. When each of these base stations determines with reference to the transmitted power value difference in the cell control information that the uplink transmitted power value to the relevant base station is larger than the uplink transmitted power value to the other base station out of the first and second uplink transmitted power values and determines with reference to the power value difference based on the difference between the predetermined reference power value and the received power value at the mobile station of the cell selection reference signal transmitted by the relevant base station that the received power value at the mobile station of the cell selection reference signal transmitted by the relevant base station is larger than the predetermined reference power value, the base station decreases by the predetermined amount the power of the cell selection reference signal broadcasted into the cell established by the base station specified by the identification information in the cell control information. Conversely, when each of these base stations determines with reference to the transmitted power value difference in the cell control information that the uplink transmitted power value to the relevant base station is smaller than the uplink transmitted power value to the other base station out of the first and second uplink transmitted power values and determines with reference to the power value difference based on the difference between the predetermined reference power value and the received power value at the mobile station of the cell selection reference signal transmitted by the relevant base station that the received power value at the mobile station of the cell selection reference signal transmitted by the relevant base station is not more than the predetermined reference power value, the base station increases by the predetermined amount the power of the cell selection reference signal broadcasted into the cell established by the relevant base station specified by the identification information in the cell control information. The base stations connected to the mobile station before and after the handover decrease or increase the powers of the cell selection reference signals broadcasted into the cells established by the respective base stations, based on the cell control information transmitted from the mobile station, whereby it is feasible to equalize the sizes of the cells and adjust the overlap of the cells. As a result, it is feasible to achieve excellent quality of communication while reducing the interference in the uplink from the mobile station to the neighboring base station and the interference in the downlink from the neighboring base station to the mobile station. Furthermore, since the cell control information transmitted from the mobile station to the base stations is comprised of the information based on the differences, the volume thereof becomes lower than that in transmission of the individual power values like the uplink transmitted power values as information.

In the mobile communication system of the present invention, preferably, the cell control information transmitting means of the mobile station transmits to the first base station the first cell control information containing a first received power value ratio being a ratio between the predetermined reference power value and the received power value of the first cell selection reference signal, a transmitted power value ratio about a ratio between the first uplink transmitted power value and the second uplink transmitted power value, and the first identification information, and transmits to the second base station the second cell control information containing a second received power value ratio being a ratio between the predetermined reference power value and the received power value of the second cell selection reference signal, the transmitted power value ratio, and the second identification information; and the cell controlling means of the base station is configured as follows: in the case of the relevant base station being one of the first and second base stations, based on the cell control information transmitted by the cell control information transmitting means of the mobile station, the cell controlling means controls the power of the cell selection reference signal broadcasted by the cell selection reference broadcasting means into the cell established by the relevant base station specified by the identification information in the cell control information, so that the transmitted power value ratio falls within a first predetermined range and so that the received power value ratio, which is a ratio between the predetermined reference power value and the received power value at the mobile station of the cell selection reference signal broadcasted by the relevant base station, falls within a second predetermined range.

In the base station of the present invention, preferably, the cell controlling means acquires one cell control information out of the first cell control information containing a first received power value ratio being a ratio between the predetermined reference power value and the received power value of the first cell selection reference signal, a transmitted power value ratio about a ratio between the first uplink transmitted power value and the second uplink transmitted power value, and the first identification information and transmitted to the first base station by the mobile station, and the second cell control information containing a second received power value ratio being a ratio between the predetermined reference power value and the received power value of the second cell selection reference signal, the transmitted power value ratio, and the second identification information and transmitted to the second base station by the mobile station.

In the mobile station of the present invention, preferably, the cell control information transmitting means transmits to the first base station the first cell control information containing a first received power value ratio being a ratio between the predetermined reference power value and the received power value of the first cell selection reference signal, a transmitted power value ratio about a ratio between the first uplink transmitted power value and the second uplink transmitted power value, and the first identification information, and transmits to the second base station the second cell control information containing a second received power value ratio being a ratio between the predetermined reference power value and the received power value of the second cell selection reference signal, the transmitted power value ratio, and the second identification information.

In the cell control method of the present invention, preferably, in the cell control information transmitting step, the cell control information transmitting means of the mobile station transmits to the first base station the first cell control information containing a first received power value ratio being a ratio between the predetermined reference power value and the received power value of the first cell selection reference signal, a transmitted power value ratio about a ratio between the first uplink transmitted power value and the second uplink transmitted power value, and the first identification information, and transmits to the second base station the second cell control information containing a second received power value ratio being a ratio between the predetermined reference power value and the received power value of the second cell selection reference signal, the transmitted power value ratio, and the second identification information; and in the cell control step, the cell controlling means of the base station is configured as follows: in the case of the relevant base station being one of the first and second base stations, based on the cell control information transmitted by the cell control information transmitting means of the mobile station, the cell controlling means controls the power of the cell selection reference signal broadcasted by the cell selection reference broadcasting means into the cell established by the relevant base station specified by the identification information in the cell control information so that the transmitted power value ratio falls within a first predetermined range and so that the received power value ratio being the ratio between the predetermined reference power value and the received power value at the mobile station of the cell selection reference signal broadcasted by the relevant base station, falls within a second predetermined range.

According to these aspects of the invention, the mobile station transmits to the first base station the first cell control information containing the first received power value ratio being the ratio between the predetermined reference power value and the received power value of the first cell selection reference signal, the transmitted power value ratio, i.e., the ratio between the first uplink transmitted power value and the second uplink transmitted power value, and the first identification information. The mobile station also transmits to the second base station the second cell control information containing the second received power value ratio being the ratio between the predetermined reference power value and the received power value of the second cell selection reference signal, the above transmitted power value ratio, and the second identification information. The base station corresponding to the first or second base station, i.e., one of the base stations connected to the mobile station before and after the handover acquires the cell control information transmitted by the mobile station. The base station corresponding to the first or second base station controls the power of the cell selection reference signal broadcasted into the cell established by the relevant base station specified by the identification information in the cell control information, so that the ratio between the uplink transmitted power value from the mobile station to the relevant base station and the uplink transmitted power value to the other base station falls within the first predetermined range and so that the ratio between the predetermined reference power value and the received power value at the mobile station of the cell selection reference signal broadcasted by the relevant base station falls within the second predetermined range. In the aforementioned aspects of the invention the powers of the cell selection reference signals broadcasted by the base stations were controlled using the information based on the difference of power values like the difference between the first uplink transmitted power value and the second uplink transmitted power value, whereas it also becomes feasible to control the powers of the cell selection reference signals broadcasted by the base stations, using the information based on the ratio of power values.

In the mobile communication system of the present invention, preferably, the cell controlling means of the base station is configured as follows: in the case of the relevant base station being one of the first and second base stations, the cell controlling means acquires the cell control information transmitted by the cell control information transmitting means of the mobile station; when it is determined that the uplink transmitted power value to the relevant base station is larger than the uplink transmitted power value to the other base station out of the first and second uplink transmitted power values, based on the transmitted power value ratio in the cell control information, and that the received power value at the mobile station of the cell selection reference signal transmitted by the relevant base station is larger than the predetermined reference power value, based on the received power value ratio in the cell control information, the cell controlling means decreases by a predetermined amount the power of the cell selection reference signal broadcasted by the cell selection reference broadcasting means into the cell established by the relevant base station specified by the identification information in the cell control information; and when it is determined that the uplink transmitted power value to the relevant base station is smaller than the uplink transmitted power value to the other base station out of the first and second uplink transmitted power values, based on the transmitted power value ratio in the cell control information, and that the received power value at the mobile station of the cell selection reference signal transmitted by the relevant base station is not more than the predetermined reference power value, based on the received power value ratio in the cell control information, the cell controlling means increases by a predetermined amount the power of the cell selection reference signal broadcasted by the cell selection reference broadcasting means into the cell established by the relevant base station specified by the identification information in the cell control information.

In the base station of the present invention, preferably, the cell controlling means is configured as follows: in the case of the base station being one of the first and second base stations, the cell controlling means acquires the cell control information transmitted by the cell control information transmitting means of the mobile station; when it is determined that the uplink transmitted power value to the relevant base station is larger than the uplink transmitted power value to the other base station out of the first and second uplink transmitted power values, based on the transmitted power value ratio in the cell control information, and that the received power value at the mobile station of the cell selection reference signal transmitted by the relevant base station is larger than the predetermined reference power value, based on the received power value ratio in the cell control information, the cell controlling means decreases by a predetermined amount the power of the cell selection reference signal broadcasted by the cell selection reference broadcasting means into the cell established by the relevant base station specified by the identification information in the cell control information; and when it is determined that the uplink transmitted power value to the relevant base station is smaller than the uplink transmitted power value to the other base station out of the first and second uplink transmitted power values, based on the transmitted power value ratio in the cell control information, and that the received power value at the mobile station of the cell selection reference signal transmitted by the relevant base station is not more than the predetermined reference power value, based on the received power value ratio in the cell control information, the cell controlling means increases by a predetermined amount the power of the cell selection reference signal broadcasted by the cell selection reference broadcasting means into the cell established by the relevant base station specified by the identification information in the cell control information.

In the cell control method of the present invention, preferably, in the cell control step, the cell controlling means of the base station is configured as follows: in the case of the relevant base station being one of the first and second base stations, the cell controlling means acquires the cell control information transmitted by the cell control information transmitting means of the mobile station; when it is determined that the uplink transmitted power value to the relevant base station is larger than the uplink transmitted power value to the other base station out of the first and second uplink transmitted power values, based on the transmitted power value ratio in the cell control information, and that the received power value at the mobile station of the cell selection reference signal transmitted by the relevant base station is larger than the predetermined reference power value, based on the received power value ratio in the cell control information, the cell controlling means decreases by a predetermined amount the power of the cell selection reference signal broadcasted by the cell selection reference broadcasting means into the cell established by the relevant base station specified by the identification information in the cell control information; and when it is determined that the uplink transmitted power value to the relevant base station is smaller than the uplink transmitted power value to the other base station out of the first and second uplink transmitted power values, based on the transmitted power value ratio in the cell control information, and that the received power value at the mobile station of the cell selection reference signal transmitted by the relevant base station is not more than the predetermined reference power value, based on the received power value ratio in the cell control information, the cell controlling means increases by a predetermined amount the power of the cell selection reference signal broadcasted by the cell selection reference broadcasting means into the cell established by the relevant base station specified by the identification information in the cell control information.

According to these aspects of the invention, the base station corresponding to the first or second base station acquires the cell control information transmitted by the mobile station. When each of these base stations determines with reference to the transmitted power value ratio in the cell control information that the uplink transmitted power value to the relevant base station is larger than the uplink transmitted power value to the other base station out of the first and second uplink transmitted power values and determines with reference to the power value ratio based on the ratio between the predetermined reference power value and the received power value at the mobile station of the cell selection reference signal transmitted by the relevant base station that the received power value at the mobile station of the cell selection reference signal transmitted by the relevant base station is larger than the predetermined reference power value, the base station decreases by the predetermined amount the power of the cell selection reference signal broadcasted into the cell established by the relevant base station specified by the identification information in the cell control information. Conversely, when each of these base stations determines with reference to the transmitted power value ratio in the cell control information that the uplink transmitted power value to the relevant base station is smaller than the uplink transmitted power value to the other base station out of the first and second uplink transmitted power values and determines with reference to the power value ratio based on the ratio between the predetermined reference power value and the received power value at the mobile station of the cell selection reference signal transmitted by the relevant base station that the received power value at the mobile station of the cell selection reference signal transmitted by the relevant base station is not more than the predetermined reference power value, the base station increases by the predetermined amount the power of the cell selection reference signal broadcasted into the cell established by the relevant base station specified by the identification information in the cell control information. In the aforementioned aspects of the invention the power of the cell selection reference signal broadcasted by each base station was controlled using the information based on the difference of power values like the difference between the first uplink transmitted power value and the second uplink transmitted power value, whereas it also becomes feasible to control the power of the cell selection reference signal broadcasted by each base station, using the information based on the ratio of power values.

In the mobile communication system of the present invention, preferably, the cell control information transmitting means of the mobile station is configured as follows: when the received power value of the cell selection reference signal transmitted by one base station out of the first base station and the second base station is larger than the predetermined reference power value and when the uplink transmitted power value to the one base station is larger than the uplink transmitted power value to the other base station out of the first base station and the second base station, the cell control information transmitting means transmits to the one base station the cell control information in which the identification information in the cell selection reference signal transmitted by the one base station is correlated with cell change information for demanding a decrease in a size of the cell established by the one base station specified by the identification information in the cell selection reference signal transmitted by the one base station; and when the received power value of the cell selection reference signal transmitted by the one base station is smaller than the predetermined reference power value and when the uplink transmitted power value to the one base station is not more than the uplink transmitted power value to the other base station, the cell control information transmitting means transmits to the one base station the cell control information in which the identification information in the cell selection reference signal transmitted by the one base station is correlated with cell change information for demanding an increase in the size of the cell established by the one base station specified by the identification information in the cell selection reference signal transmitted by the one base station; and the cell controlling means of each of the base stations is configured as follows: in the case of the relevant base station being one of the first and second base stations, the cell controlling means acquires the cell control information transmitted by the cell control information transmitting means of the mobile station; when the cell change information in the cell control information is one for demanding a decrease in the size of the cell, the cell controlling means decreases by a predetermined amount the power of the cell selection reference signal broadcasted by the cell selection reference broadcasting means into the cell established by the relevant base station specified by the identification information in the cell control information; and when the cell change information in the cell control information is one for demanding an increase in the size of the cell, the cell controlling means increases by a predetermined amount the power of the cell selection reference signal broadcasted by the cell selection reference broadcasting means into the cell established by the relevant base station specified by the identification information in the cell control information.

In the base station of the present invention, preferably, the cell controlling means is configured as follows: when the base station is one of the first and second base stations, when the received power value at the mobile station of the cell selection reference signal transmitted by the relevant base station is larger than the predetermined reference power value, and when the uplink transmitted power value from the mobile station to the relevant base station is larger than the uplink transmitted power value to the other base station out of the first and second base stations, the cell controlling means acquires the cell control information transmitted by the mobile station and containing cell change information for demanding a decrease in a size of the cell established by the relevant base station specified by the identification information in the cell selection reference signal transmitted by the relevant base station, and the identification information in the cell selection reference signal transmitted by the relevant base station; when the relevant base station is one of the first and second base stations, when the received power value at the mobile station of the cell selection reference signal transmitted by the relevant base station is smaller than the predetermined reference power value, and when the uplink transmitted power value from the mobile station to the relevant base station is not more than the uplink transmitted power value to the other base station out of the first and second base stations, the cell controlling means acquires the cell control information transmitted by the mobile station and containing cell change information for demanding an increase in the size of the cell established by the relevant base station specified by the identification information in the cell selection reference signal transmitted by the relevant base station, and the identification information in the cell selection reference signal transmitted by the relevant base station; when the cell change information in the cell control information is one for demanding a decrease in the size of the cell, the cell controlling means decreases by a predetermined amount the power of the cell selection reference signal broadcasted by the cell selection reference broadcasting means into the cell established by the relevant base station specified by the identification information in the cell control information; and when the cell change information in the cell control information is one for demanding an increase in the size of the cell, the cell controlling means increases by a predetermined amount the power of the cell selection reference signal broadcasted by the cell selection reference broadcasting means into the cell established by the relevant base station specified by the identification information in the cell control information.

In the mobile station of the present invention, preferably, the cell control information transmitting means is configured as follows: when the received power value of the cell selection reference signal transmitted by one base station out of the first base station and the second base station is larger than the predetermined reference power value and when the uplink transmitted power value to the one base station is larger than the uplink transmitted power value to the other base station out of the first base station and the second base station, the cell control information transmitting means transmits to the one base station the cell control information in which the identification information in the cell selection reference signal transmitted by the one base station is correlated with cell change information for demanding a decrease in a size of the cell established by the one base station specified by the identification information in the cell selection reference signal transmitted by the one base station; and when the received power value of the cell selection reference signal transmitted by the one base station is smaller than the predetermined reference power value and when the uplink transmitted power value to the one base station is not more than the uplink transmitted power value to the other base station, the cell control information transmitting means transmits to the one base station the cell control information in which the identification information in the cell selection reference signal transmitted by the one base station is correlated with cell change information for demanding an increase in the size of the cell established by the one base station specified by the identification information in the cell selection reference signal transmitted by the one base station.

In the cell control method of the present invention, preferably, in the cell control information transmitting step, the cell control information transmitting means of the mobile station is configured as follows: when the received power value of the cell selection reference signal transmitted by one base station out of the first base station and the second base station is larger than the predetermined reference power value and when the uplink transmitted power value to the one base station is larger than the uplink transmitted power value to the other base station out of the first base station and the second base station, the cell control information transmitting means transmits to the one base station the cell control information in which the identification information in the cell selection reference signal transmitted by the one base station is correlated with cell change information for demanding a decrease in a size of the cell established by the one base station specified by the identification information in the cell selection reference signal transmitted by the one base station; and when the received power value of the cell selection reference signal transmitted by the one base station is smaller than the predetermined reference power value and when the uplink transmitted power value to the one base station is not more than the uplink transmitted power value to the other base station, the cell control information transmitting means transmits to the one base station the cell control information in which the identification information in the cell selection reference signal transmitted by the one base station is correlated with cell change information for demanding an increase in the size of the cell established by the one base station specified by the identification information in the cell selection reference signal transmitted by the one base station; and in the cell control step, the cell controlling means of each of the base stations is configured as follows: in the case of the relevant base station being one of the first and second base stations, the cell controlling means acquires the cell control information transmitted by the cell control information transmitting means of the mobile station; when the cell change information in the cell control information is one for indicating a decrease in the size of the cell, the cell controlling means decreases by a predetermined amount the power of the cell selection reference signal broadcasted by the cell selection reference broadcasting means into the cell established by the relevant base station specified by the identification information in the cell control information; and when the cell change information in the cell control information is one for indicating an increase in the size of the cell, the cell controlling means increases by a predetermined amount the power of the cell selection reference signal broadcasted by the cell selection reference broadcasting means into the cell established by the relevant base station specified by the identification information in the cell control information.

According to these aspects of the invention, when the received power value of the cell selection reference signal transmitted by one base station out of the first base station and the second base station is larger than the predetermined reference power value and when the uplink transmitted power value to the one base station is larger than the uplink transmitted power value to the other base station, the mobile station transmits the cell control information in which the identification information in the cell selection reference signal is correlated with the cell change information for demanding the decrease in the size of the cell established by the one base station. The above base station, acquiring this cell control information, specifies the cell with reference to the identification information in the cell control information and, when the cell control information contains the cell change information about the demand for the decrease in the size of the cell, it decreases by the predetermined amount the transmitted power of the cell selection reference signal broadcasted into the specified cell. Conversely, when the received power value of the cell selection reference signal transmitted by the one base station is smaller than the predetermined reference power value and when the uplink transmitted power value to the one base station is not more than the uplink transmitted power value to the other base station, the mobile station transmits the cell control information in which the identification information in the cell selection reference signal is correlated with the cell change information about the demand for the increase in the size of the cell to the one base station. The above base station, acquiring this cell control information, specifies the cell with reference to the identification information in the cell control information and, when the cell control information contains the cell change information about the demand for the increase in the size of the cell, the base station increases by the predetermined amount the transmitted power of the cell selection reference signal broadcasted into the specified cell. Since the cell control information transmitted from the mobile station to the base station contains the identification information for specifying the cell, and the cell change information for indicating the increase or decrease in the power of the cell selection reference signal in the cell, the volume of the information transmitted from the mobile station to the base station is further reduced, as compared with that in the aforementioned aspects of the invention.

BRIEF DESCRIPTION OF THE DRAWINGS

FIG. 3A is a diagram showing a signal format of a cell selection reference signal which a base station according to the first embodiment broadcasts into a cell.

FIG. 3B is a diagram showing a signal format of a cell selection reference signal which a base station according to the first embodiment broadcasts into a cell.

FIG. 4 is a diagram showing a signal format for notification of an end of a cell change.

FIG. 5A is a diagram showing a format of cell control information according to the first embodiment.

FIG. 5B is a diagram showing a format of cell control information according to the first embodiment.

FIG. 7A is an illustration for explaining an example of operation to change the sizes of cells established by base stations.

FIG. 7B is an illustration for explaining an example of operation to change the sizes of cells established by base stations.

FIG. 7C is an illustration for explaining an is example of operation to change the sizes of cells established by base stations.

FIG. 7D is an illustration for explaining an example of operation to change the sizes of cells established by base stations.

FIG. 13 is a diagram showing a format of cell control information transmitted by a cell control information transmitter according to the second embodiment.

DESCRIPTION OF THE PREFERRED EMBODIMENTS

First Embodiment

Figure 1:
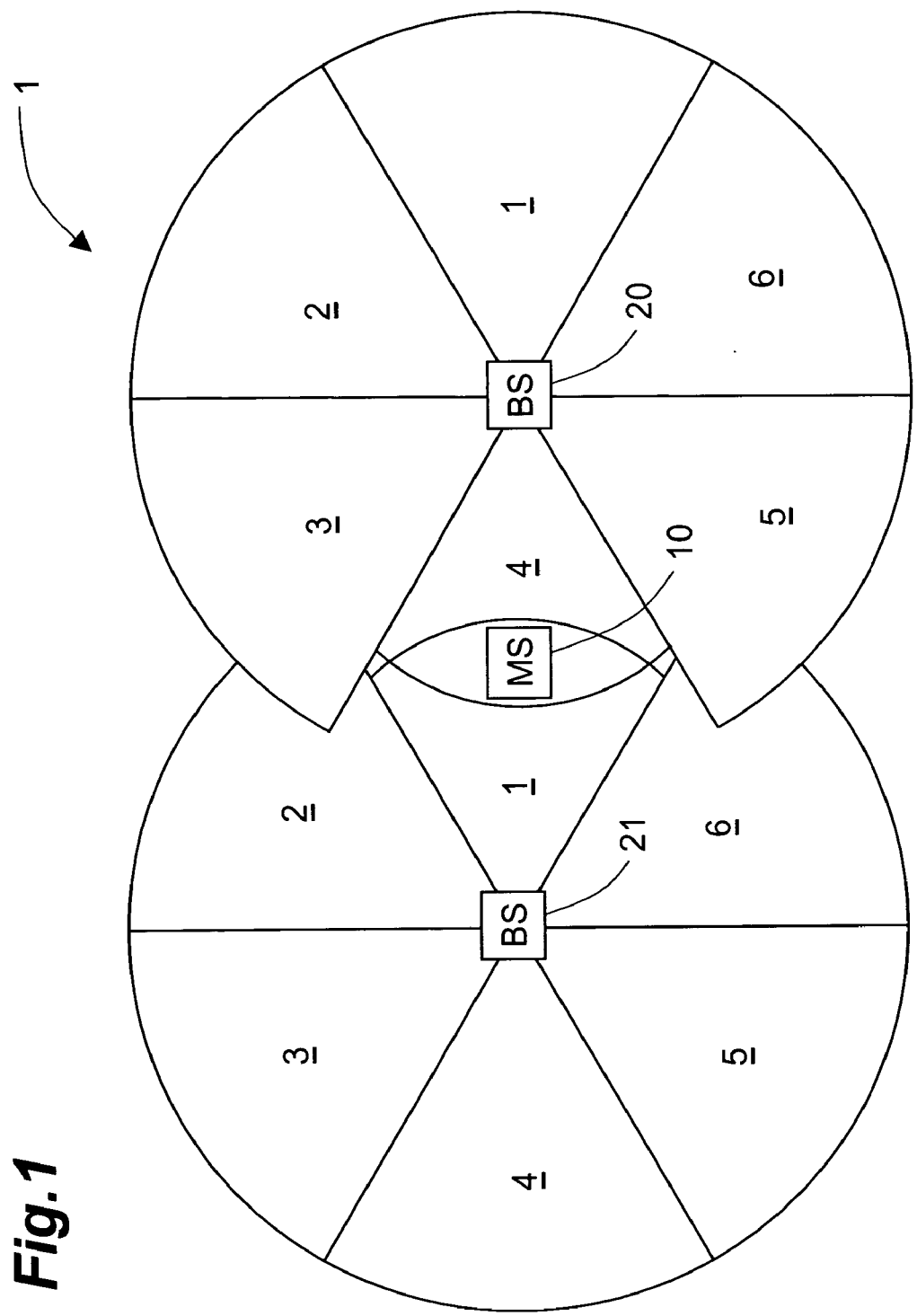
FIG. 1 is an illustration showing a configuration of a mobile communication system according to the first embodiment.

Mobile communication system 1 according to the first embodiment of the present invention will be described with reference to the accompanying drawings. FIG. 1 is an illustration showing the configuration of mobile communication system 1. As shown in FIG. 1, mobile communication system 1 is comprised of mobile station (MS) 10, and a plurality of base stations (BSs) 20, 21, . . . (among which only base stations 20 and 21 are illustrated in FIG. 1).

Mobile station 10 communicates with base stations 20, 21, . . . by CDMA (Code Division Multiple Access) communication. In FIG. 1, two base stations 20 and 21 are shown. Each of base stations 20 and 21 has six sector cells (cells) and each cell is given a specific cell identifier.

The size of each of these cells is defined as the size of a range in which a cell selection reference signal to be broadcasted into each cell by base station 20, 21 reaches at a predetermined power.

Mobile station 10 undergoes a handover to switch its connection from one base station to another as a base station from which the cell selection reference signal can be received at maximum intensity, in the region where cells established by respective base stations 20 and 21 overlap each other. In FIG. 1, the cell with cell identifier "4" established by base station 20 overlaps the cell with cell identifier "1" established by base station 21, and mobile station 10 undergoes a handover in this overlapping region. The details of mobile station 10 and base station 20, 21, . . . will be described below.

Mobile station 10 is a mobile communication terminal such as a cell phone or the like to perform CDMA communication. Mobile station 10 is physically equipped with a CPU (central processing unit), a storage device like a memory, an input device like push buttons, a display device like a display unit, a communication device, and so on.

Figure 2:
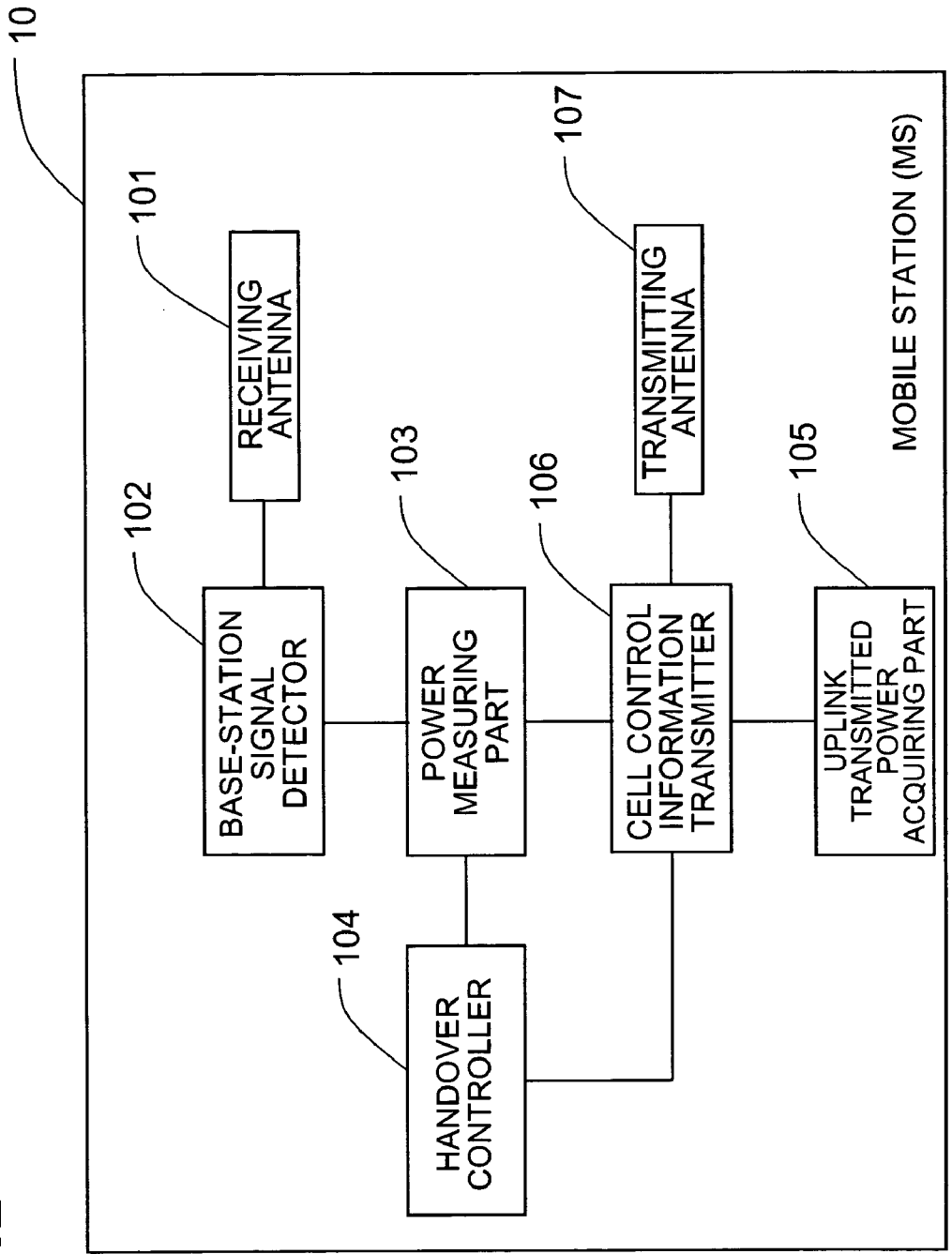
FIG. 2 is a block diagram showing a functional configuration of a mobile station according to the first embodiment.

FIG. 2 is a block diagram showing the functional configuration of mobile station 10. Mobile station 10 is comprised of receiving antenna 101, base-station signal detector (cell selection reference receiving means) 102, power measuring part (cell selection reference received power measuring means) 103, handover controller 104, uplink power acquiring part (uplink power acquiring means) 105, cell control information transmitter (cell control information transmitting means) 106, and transmitting antenna 107. The functional components of mobile station 10 will be described below each in detail.

Receiving antenna 101 is an antenna for receiving radio waves transmitted from base stations 20, 21, . . . Transmitting antenna 101 is an antenna for transmitting radio waves from mobile station 10 to the base stations. Mobile station 10 transmits the radio waves to each of base stations 20, 21, . . . , using transmitting antenna 107.

Base-station signal detector 102 is a part configured so that, when receiving a cell selection reference signal from base station 20, 21, . . . , it outputs the received cell selection reference signal to power measuring part 103. When receiving a cell change end notification indicating an end of a process of changing the size of the cell from each of base stations 20, 21, . . . , the base-station signal detector 102 outputs the received cell change end notification to cell control information transmitter 106.

The formats of the cell selection reference signals broadcasted by the base stations and the cell change end notification signal will be described. FIG. 3A shows the signal format of the cell selection reference signal broadcasted into the cell of cell identifier "4" by base station 20, and FIG. 3B the signal format of the cell selection reference signal broadcasted into the cell of cell identifier "1" by base station 21. As shown in FIGS. 3A and 3B, each of base stations 20 and 21 broadcasts the cell selection reference signal containing a base station identifier for identification of a base station and a cell identifier for identification of a cell, into the cell with the cell identifier established thereby.

As shown in FIG. 3A, base station 20 broadcasts into the cell of cell identifier "4", the cell selection reference signal containing the base station identifier "1" for specifying base station 20, and the cell identifier "4" for specifying the cell. On the other hand, as shown in FIG. 3B, base station 21 broadcasts into the cell of cell identifier "1", the cell selection reference signal containing the base station identifier "2" for specifying base station 21, and the cell identifier "1" for specifying the cell.

FIG. 4 shows the signal format of the cell change end notification. As shown in FIG. 4, the cell change end notification broadcasted from each base station is a signal containing a destination mobile station identifier and notification information. The mobile station identifier is information for identifying a target mobile station expected to end a process of transmitting information about a change in the size of the cell to the base station, when receiving this cell change end notification. When the notification contains "every MS" as a mobile station identifier, as shown in FIG. 4, the target of this notification is every mobile station.

The notification information indicates a type of an instruction to instruct the mobile station and, in FIG. 4, this notification information contains "end of change" indicating that the mobile station should end the process of transmitting the information associated with the change in the size of the cell. When base-station signal detector 102 receives such a cell change end notification, the base-station signal detector 102 outputs an instruction for suspending the process of transmitting the information about the change of the cell to the base station, to the cell control information transmitter 106. This causes the cell control information transmitter 106 to end the process of transmitting the cell control information to the base station. This cell control information will be described later.

Power measuring part 103 measures the received power of the cell selection reference signal received by base-station signal detector 102.

When handover controller 104 refers to the received power value of the cell selection reference signal measured by power measuring part 103 and thereby detects a change from a current base station to another base station as a base station broadcasting the cell selection reference signal at the received power of maximum intensity, it implements a handover to switch the base station presently connected to mobile station 10, to the base station broadcasting the cell selection reference signal at the received power of maximum intensity.

Uplink transmitted power acquiring part 105 acquires power values of radio waves of uplinks from mobile station 10 to respective base stations 20, 21, . . . , i.e., uplink transmitted power values and stores the uplink transmitted power values of the respective uplinks.

Cell control information transmitter 106 transmits the cell control information to the base stations connected to mobile station 10 before and after the handover executed by handover controller 104. For example, as shown in FIG. 1, mobile station 10 moves in the direction from the cell of cell identifier "1" established by base station 21 toward the cell of cell identifier "4" established by base station 20, and, on the occasion of the handover executed by handover controller 104, cell control information transmitter 106 transmits the cell control information to each of base station 20 and base station 21. FIG. 5A and FIG. 5B are diagrams showing the formats of the cell control information transmitted to the respective base stations 20 and 21 by cell control information transmitter 106. As shown in FIGS. 5A and 5B, the cell control information contains a base station identifier, a cell identifier, a destination BS uplink transmitted power value, an other BS uplink transmitted power value, and a cell selection reference signal received power value.

The base station identifier is information to specify a base station as a recipient of the cell control information. The cell control information shown in FIG. 5A contains base station identifier "1" specifying base station 20. On the other hand, the cell control information shown in FIG. 5B contains base station identifier "2" of base station 21 as a recipient of this cell control information.

The cell identifier is information for specifying a cell of the base station in which mobile station 10 received the cell selection reference signal to obtain the cell selection reference signal received power value in this cell control information. The cell control information shown in FIG. 5A contains the cell identifier "4" specifying the cell established by base station 20. On the other hand, the cell control information shown in FIG. 5B contains the cell identifier "1" specifying the cell established by base station 21.

The destination BS uplink transmitted power value is information indicating a power value of an uplink transmitted power from mobile station 10 to one base station out of the base stations connected to mobile station 10 before and after the handover. Namely, it is information indicating the power value of the uplink transmitted power from mobile station 10 to the base station to receive this cell control information. The other BS uplink transmitted power value is information indicating a power value of an uplink transmitted power from mobile station 10 to the other base station out of the base stations connected to mobile station 10 before and after the handover. The cell control information shown in FIG. 5A contains the uplink transmitted power value "P1" from mobile station 10 to base station 20, as a destination BS uplink transmitted power value, and the uplink transmitted power value "P2" from mobile station 10 to base station 21, as an other BS uplink transmitted power value. On the other hand, the cell control information shown in FIG. 5B contains the uplink transmitted power value "P2" from mobile station 10 to base station 21 as a destination BS uplink transmitted power value, and the uplink transmitted power value "P1" from mobile station 10 to base station 20 as an other BS uplink transmitted power value.

The cell selection reference signal received power value is information indicating a power value at mobile station 10 of the cell selection reference signal transmitted from each of base stations 20 and 21. The cell control information shown in FIG. 5A contains the received power value "R1" of the cell selection reference signal received by mobile station 10 in the cell of cell identifier "4" established by base station 20, as a cell selection reference signal received power value. On the other hand, the cell control information shown in FIG. 5B contains the received power value "R2" of the cell selection reference signal received by mobile station 10 in the cell of cell identifier "1" established by base station 21, as a cell selection reference signal received power value. Cell control information transmitter 106 transmits the cell control information generated for a recipient of each of the base stations connected before and after the handover as described above, to the base station of the recipient.

Figure 6:
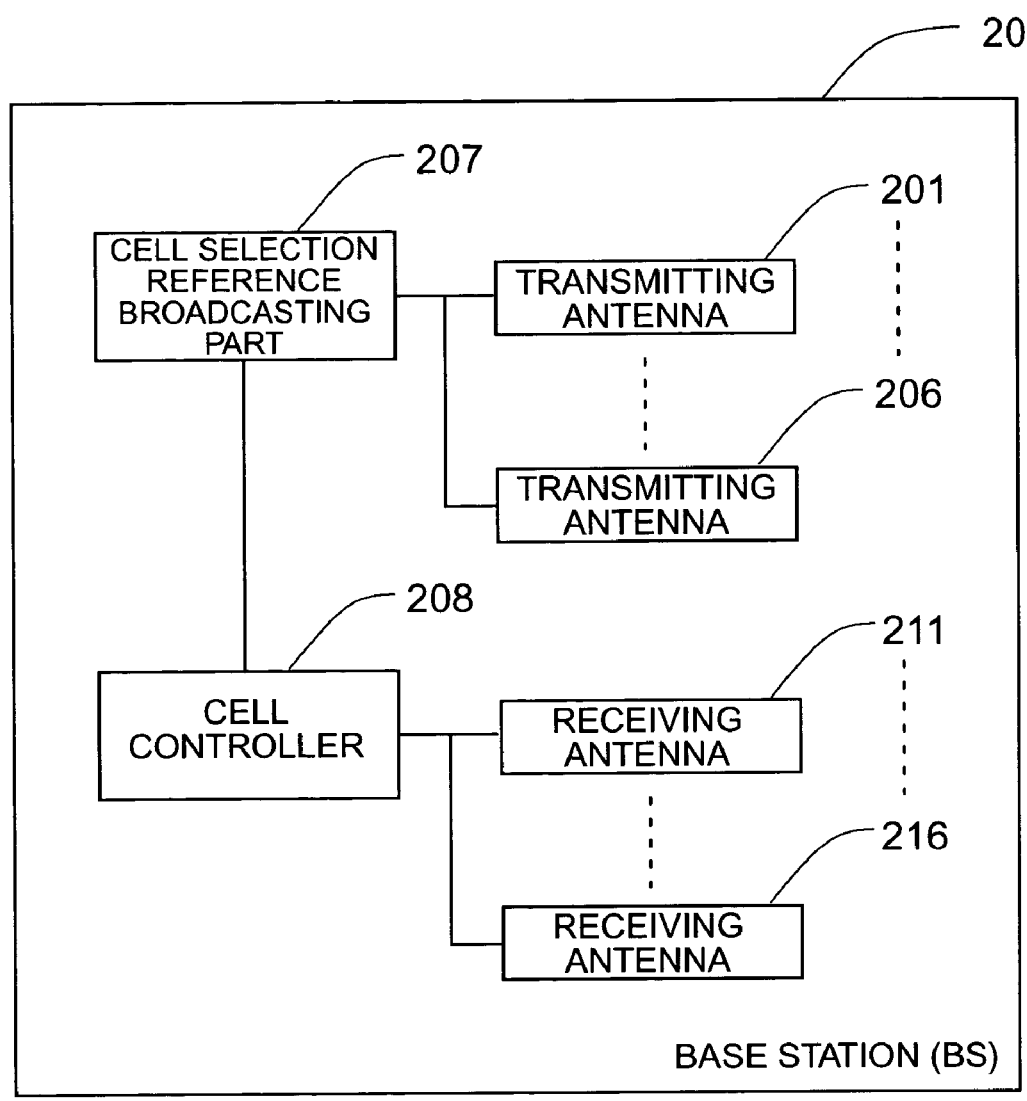
FIG. 6 is a block diagram showing a functional configuration of a base station according to the first embodiment.

Base stations 20, 21, . . . will be described below in detail. FIG. 6 is a block diagram showing the functional configuration of base station 20. The other base stations 21, . . . also have the functional configuration similar to that of base station 20.

As shown in FIG. 6, base station 20 is comprised of transmitting antennas 201–206, cell selection reference signal broadcasting part (cell selection reference broadcasting means) 207, cell controller (cell controlling means) 208, and receiving antennas 211–216.

Transmitting antennas 201–206 are antennas for transmitting individual radio waves from base station 20 to the respective cells specified by cell identifiers "1"–"6." Transmitting antennas 201–206 are also used for broadcasting the cell selection reference signals generated by cell selection reference signal broadcasting part 207, into the cells established by base station 20 and specified by cell identifiers "1"–"6."

Receiving antennas 211–216 are antennas for receiving individual radio waves transmitted by mobile station 10 in the cells established by base station 20 and specified by cell identifiers "1"–"6." Receiving antennas 211–216 are also used for receiving the cell control information transmitted by mobile station 10 in the respective cells.

Cell selection reference signal broadcasting part 207 generates the cell selection reference signals of the aforementioned signal format to be broadcasted into the respective cells established by base station 20. Cell selection reference signal broadcasting part 207 broadcasts the generated cell selection reference signals at respective powers controlled by cell controller 208, using the transmitting antennas 201–206 provided for the respective cells.

Cell controller 208 acquires the cell control information transmitted by mobile station 10 and received by one of receiving antennas 211–216. Cell controller 208 checks the base station identifier included in the acquired cell control information to determine whether the cell control information is one transmitted to the base station of its own. When cell controller 208 acknowledges that the acquired cell control information is one transmitted to the base station of its own, it refers to the cell identifier in the cell control information to specify the cell established by the base station of its own. Cell controller 208 controls the power value of the cell selection reference signal broadcasted into the cell specified as described above, in a step-by-step manner by a predetermined amount each, based on the destination BS uplink transmitted power value, other BS uplink transmitted power value, and cell selection reference signal received power value included in the cell control information, and based on a predetermined reference power value R0 of the cell selection reference signal.

In this control, cell controller 208 subtracts the other BS uplink transmitted power value from the destination BS uplink transmitted power value in the cell control information to obtain the difference as K. Cell controller 208 also subtracts the above reference power value R0 from the cell selection reference signal received power value in the cell control information to obtain the difference as L. In a case of K<0 and L=0, cell controller 208 increases by a predetermined amount the power of the cell selection reference signal broadcasted into the cell specified by the cell identifier in the cell control information. On the other hand, in a case of K>0 and L>0, cell controller 208 decreases by a predetermined amount the power of the cell selection reference signal broadcasted into the cell specified by the cell identifier in the cell control information. In the cases other than these conditions, cell controller 208 does not execute the process of changing the power of the cell selection reference signal.

An example of the operation of changing the size of the cell by each of base stations 20 and 21 will be described below with reference to FIGS. 7A, 7B, 7C, and 7D. FIGS. 7A, 7B, 7C, and 7D are illustrations showing steps of the operation of changing the sizes of the cells by base stations 20 and 21.

First, let us suppose that base station 21 is set adjacent to base station 20 already placed and that the cell of base station identifier "4" established by base station 20 overlaps the cell of base station identifier "1" established by base station 21, in the boundary region between them, as shown in FIG. 7A. It is also assumed that the size of the cell of base station identifier "1" established by base station 21 is smaller than that of the cell of base station identifier "4" established by base station 20.

In the state shown in FIG. 7A, mobile station 10 has moved from the interior of the cell of base station identifier "1" established by base station 21, into the boundary region thereof and is present at the location where the cell of base station identifier "1" established by base station 21 overlaps the cell of the base station identifier "4" established by base station 20. When in this state the received power value of the cell selection reference signal from base station 20 becomes larger than the received power value of the cell selection reference signal from base station 21 received by mobile station 10, mobile station 10 undergoes a handover from base station 21 to base station 20 as a base station to be connected.

At this time, the distance from mobile station 10 to base station 21 is shorter than the distance from mobile station 10 to base station 20, so that the radio wave of the uplink from mobile station 10 to base station 20 must be stronger, so as to interfere at base station 21. Before and after the handover, mobile station 10 acquires uplink transmitted power values to base station 21 and base station 20 connected before and after the handover, and received power values of the cell selection reference signals.

Mobile station 10 transmits the cell control information containing the acquired uplink transmitted power value and the received power value of the cell selection reference signal to each of base station 20 and base station 21. The signal formats of the cell control information transmitted by mobile station 10 in this case are the format shown in FIG. 5A for base station 20 and the format shown in FIG. 5B for base station 21.

Each of base station 20 and base station 21 receives the cell control information transmitted by mobile station 10. In the case of the state shown in FIG. 7A, according to the cell control information received at base station 21, the uplink reference power value P2 from mobile station 10 to base station 21 is smaller than the uplink reference power value P1 from mobile station 10 to base station 20, so that K<0. Furthermore, the received power value R2 of the cell selection reference signal broadcasted by base station 21 and measured by mobile station 10 is a value approximately equal to the reference power value R0, so that L=0. Therefore, base station 21 increases by the predetermined amount the power value of the cell selection reference signal broadcasted into the cell specified by cell identifier "1" in the cell control information. Then the size of the cell of cell identifier "1" established by base station 21 increases as shown in FIG. 7B.

When mobile station 10 further moves away from base station 21 and toward base station 20, as shown in FIG. 7C, mobile station 10 undergoes a handover from base station 21 to base station 20 as a base station to be connected. At this time, mobile station 10 generates the cell control information to be transmitted to base station 20 and base station 21 as described above, and transmits the generated cell control information to each of base station 20 and base station 21.

In the case of the state shown in FIG. 7C, according to the cell control information transmitted from mobile station 10 to base station 20, the uplink transmitted power value P1 from mobile station 10 to base station 20 is larger than the uplink transmitted power value P2 from mobile station 10 to base station 21, so that K>0. Furthermore, the received power value R1 at mobile station 10 of the cell selection reference signal broadcasted into the cell of cell identifier "4" by base station 20 becomes larger than the reference power value R0, so that L>0. Therefore, base station 20 decreases by the predetermined amount the power value of the cell selection reference signal broadcasted into the cell of cell identifier "4," so as to decrease the size of the cell of cell identifier "4" established by base station 20. Through repetitions of the operation as described above, the power value of the cell selection reference signal broadcasted into the cell of cell identifier "4" by base station 20 becomes substantially equal to the power value of the cell selection reference signal broadcasted into the cell of cell identifier "1" by base station 21, so that the size of the cell of cell identifier "4" established by base station 20 becomes substantially equal to the size of the cell of cell identifier "1" established by base station 21. On the occasion of the handover of mobile station 10 between base station 20 and base station 21 as a base station to be connected, mobile station 10 measures the received power values of the respective cell selection reference signals broadcasted into the cell of cell identifier "4" established by base station 20 and broadcasted into the cell of cell identifier "1" established by base station 21, and controls the power values of the respective cell selection reference signals so that the received power values of these become substantially equal to the reference power value R0, whereby the overlap is adjusted in the boundary region between the cell of cell identifier "4" established by base station 20 and the cell of cell identifier "1" established by base station 21. The powers of the cell selection reference signals broadcasted by the base stations are suitably controlled so that the difference between the uplink transmitted power values to the respective base stations connected to mobile station 10 before and after the handover falls within the predetermined range and so that the difference between the reference power value R0 and the received power value at mobile station 10 of the cell selection reference signal broadcasted from each of the base stations connected to mobile station 10 before and after the handover falls within the predetermined range.

Figure 8:
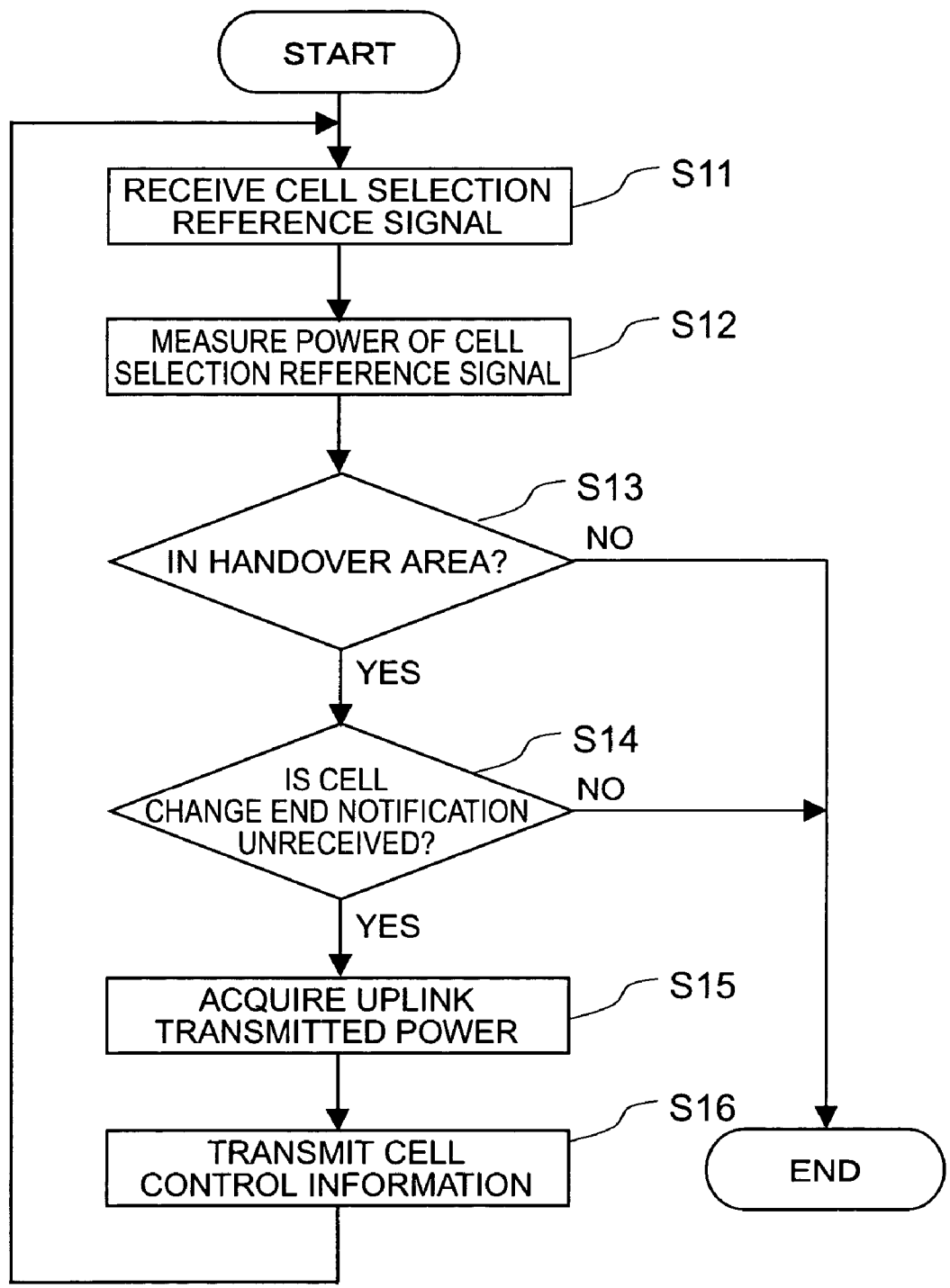
FIG. 8 is a flowchart showing processing at a mobile station in a cell control method according to the first embodiment.

The cell control method by mobile communication system 1 according to the present embodiment will be described below. First, the processing at mobile station 10 in this cell control method will be described with reference to FIG. 8. FIG. 8 is a flowchart showing the processing at mobile station 10 in the cell control method according to the present embodiment. As shown in FIG. 8, mobile station 10 receives radio waves transmitted from the base stations forming their respective cells at its present location, through receiving antenna 101. Then the base-station signal detector 102 detects the cell selection reference signal or the cell change end notification from the radio waves received through receiving antenna 101 (step S11).

Next, power measuring part 103 measures power values of the cell selection reference signals detected by base-station signal detector 102 (step S12). Based on the power values measured by power measuring part 103, the handover controller 104 then determines whether the received power value of the cell selection reference signal from the other base station becomes larger than the received power value of the cell selection reference signal from the base station presently under connection, and thereby determines whether mobile station 10 is located in a handover area (step S13).

When the result of this determination is that the received power value of the cell selection reference signal from the base station presently under connection is not less than the received power value of the cell selection reference signal from the other base station, handover controller 104 terminates the processing without switching of the base station to be connected.

On the other hand, when the received power value of the cell selection reference signal from the other base station becomes larger than the received power value of the cell selection reference signal from the base station presently under connection, handover controller 104 effects a handover. The handover controller 104 also instructs cell control information transmitter 106 to transmit the cell control information to the base stations connected before and after the handover.

Cell control information transmitter 106, receiving this instruction, first determines whether base-station signal detector 102 has detected a cell change end notification transmitted from the base stations connected before and after the above handover (step S14).

When the result of this determination is that base-station signal detector 102 has already received the above cell change end notification, cell control information transmitter 106 terminates the processing. On the other hand, if base-station signal detector 102 has detected no cell change end notification yet, cell control information transmitter 106 acquires the uplink transmitted power values to the respective base stations connected before and after the handover (step S15), which were stored by uplink transmitted power acquiring part 105. Then, as described previously, cell control information transmitter 106 generates the cell control information to be transmitted to each of the base stations connected before and after the handover, and then transmits the generated control information to each base station (step S16). Mobile station 10 repeats the above processing.

Figure 9:
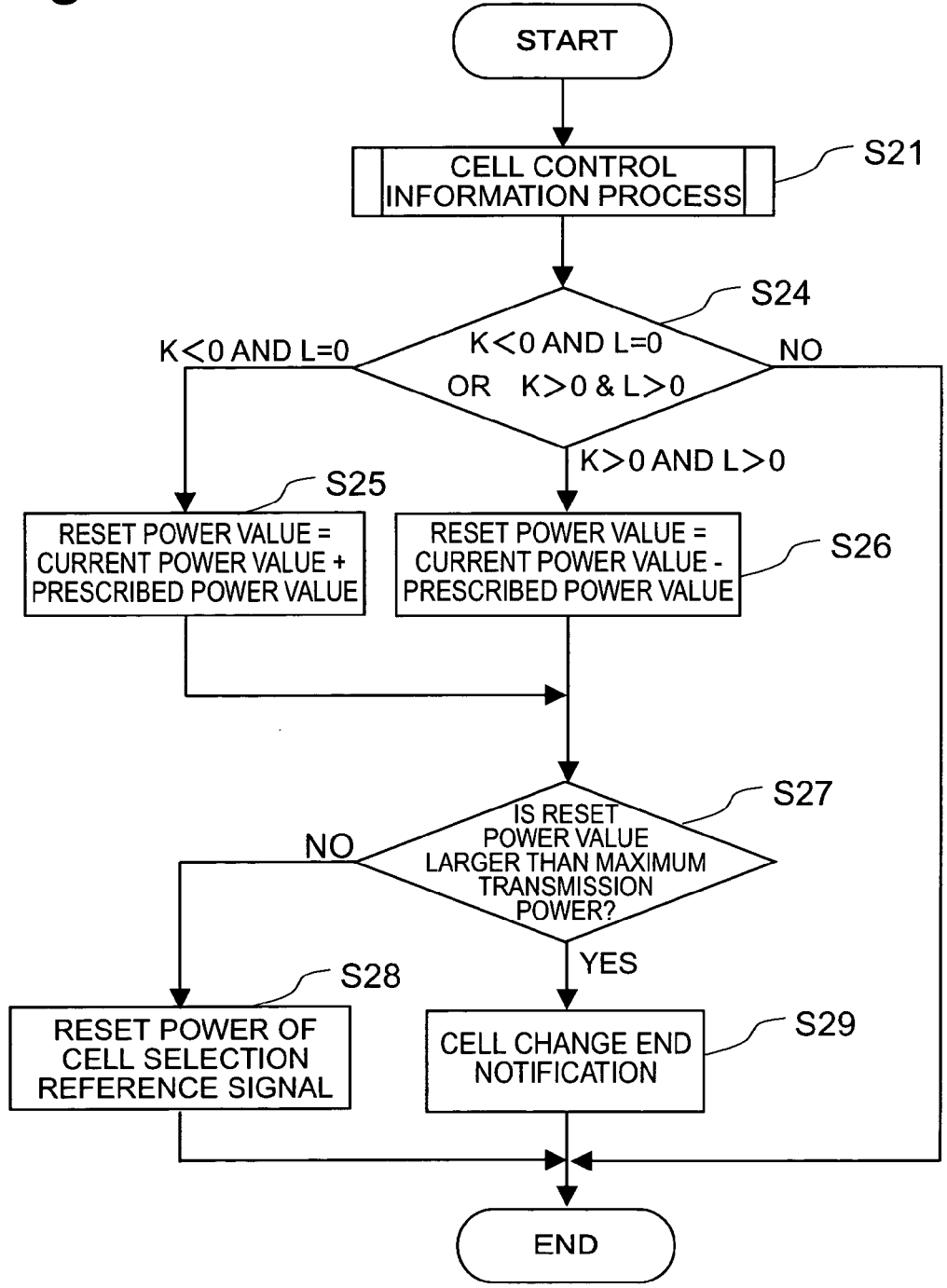
FIG. 9 is a flowchart showing processing at a base station in a cell control method according to the first embodiment.
Figure 10:
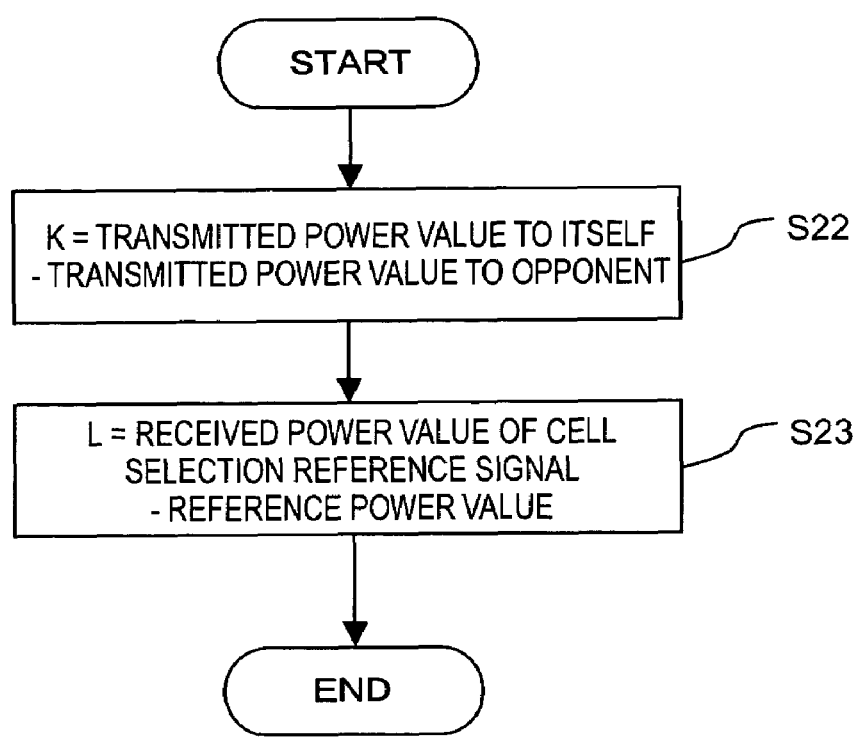
FIG. 10 is a flowchart of cell control information processing in the flowchart shown in FIG. 9.

The processing at base stations 20, 21, . . . in the cell control method according to the present embodiment will be described below with reference to FIG. 9 and FIG. 10. FIG. 9 is a flowchart of the processing executed at base stations 20, 21, . . . in the cell control method according to the present embodiment. FIG. 10 is a flowchart of a cell control information process in the flowchart shown in FIG. 9.

First, as shown in FIG. 9, the base station connected to mobile station 10 performs the cell control information process (step S21) shown in FIG. 10, when receiving the cell control information from mobile station 10. In this cell control information process, as shown in FIG. 10, cell controller 208 of the base station connected to mobile station 10 refers to the contents of the cell control information transmitted from mobile station 10 and calculates the difference K between the uplink transmitted power value to the base station of its own and the transmitted power value to the other base station (opponent) out of the base stations connected to the mobile station before and after the handover (step S22). Cell controller 208 refers to the contents of the cell control information transmitted from mobile station 10 and calculates the difference L between the reference power value R0 and the received power value at mobile station 10 of the cell selection reference signal broadcasted by the base station of its own (step S23).

Returning to FIG. 9, cell controller 208 determines whether the condition of "K<0 and L=0" or the condition of "K>0 and L>0" is met, using the above K and L (step S24). When cell controller 208 determines that the condition of "K<0 and L=0" is met, cell controller 208 adds a prescribed power value to the current power value of the cell selection reference signal to be broadcasted into the cell specified by the cell identifier in the above cell control information, to obtain a reset power value (step S25). When cell controller 208 determines on the other hand that the condition of "K>0 and L>0" is met, cell controller 208 subtracts a prescribed power value from the current power value of the cell selection reference signal to be broadcasted into the cell specified by the cell identifier in the above cell control information, to obtain the difference as a reset power value (step S26). When cell controller 208 determines that the above conditions are not met, it terminates the processing.

Then cell controller 208 determines whether the reset power value obtained as described above is larger than a maximum that can be set as a transmitted power value of the cell selection reference signal broadcasted by cell selection reference signal broadcasting part 207 (step S27). When the result of this determination is that the reset power value is not more than the above maximum transmitted power, cell controller 208 resets the power value of the cell selection reference signal to be broadcasted into the cell specified by the cell identifier in the cell control information, to the above reset power value (step S28). On the other hand, when the reset power value is larger than the above maximum transmitted power, cell controller 208 transmits the aforementioned cell change end notification to mobile station 10 (step S29).

The action and effect of mobile communication system 1 according to the present embodiment will be described below. In mobile communication system 1 of the present embodiment, each of base stations 20, 21, . . . broadcasts the cell selection reference signal containing the base station identifier for specifying the base station of its own and the cell identifier for specifying the cell established by the base station of its own, into the cell specified by the cell identifier.

On the occasion of a handover to switch the base station to be connected among these base stations, mobile station 10 receives the cell selection reference signals broadcasted by the respective base stations connected before and after this switching. Mobile station 10 measures each of received power values of the cell selection reference signals thus received. Mobile station 10 also acquires each of the uplink transmitted power values to the base stations connected before and after the above switching. Mobile station 10 transmits to one of the base stations connected before and after the above switching, the cell control information containing the base station identifier specifying the base station, the cell identifier specifying the cell, the uplink transmitted power value to the base station, the uplink transmitted power value to the other base station, and the received power value of the cell selection reference signal broadcasted from the base station. Mobile station 10 also transmits to the other base station out of the base stations connected before and after the above switching, the cell control information containing the base station identifier specifying the base station, the cell identifier specifying the cell, the uplink transmitted power value to the base station, the uplink transmitted power value to the above one base station, and the received power value of the cell selection reference signal broadcasted by the base station.

Each base station, receiving the cell control information transmitted by mobile station 10, refers to the cell identifier in the received cell control information to specify the cell established by itself. When each base station determines with reference to the received cell control information that the uplink transmitted power value from mobile station 10 to itself is larger than the uplink transmitted power value to the other base station and that the received power value at mobile station 10 of the cell selection reference signal transmitted by itself is larger than the predetermined reference power value R0, it decreases by the predetermined amount the power of the cell selection reference signal broadcasted into the cell established by the base station itself specified as described above. Conversely, when each base station determines that the uplink transmitted power value from mobile station 10 to itself is smaller than the uplink transmitted power value to the other base station and that the received power value at the mobile station of the cell selection reference signal broadcasted by itself is not more than the predetermined reference power value, it increases by the predetermined amount the power of the cell selection reference signal broadcasted into the cell established by the base station itself specified as described above.

Each of the base stations connected to mobile station 10 before and after the handover decreases or increases the power of the cell selection reference signal broadcasted into the cell on the basis of the cell control information transmitted from the mobile station, as described above, so as to make substantially equal the transmitted power values of the cell selection reference signals broadcasted into the cells where mobile station 10 is located before and after the handover. As a result, it is feasible to equalize the sizes of the cells of the two base stations where mobile station 10 is located before and after the handover.

The base stations connected to mobile station 10 before and after the handover control the power values of the cell selection reference signals broadcasted into their respective cells, so that the received power values of the cell selection reference signals received before and after the handover by mobile station 10 become substantially equal to the reference power value R0. As a result, the overlap is adjusted in the boundary region between the cells established by the base stations connected to mobile station 10 before and after the handover. This reduces the interference in the uplink from mobile station 10 to the base station and the interference in the downlink from the base station to mobile station 10, thus achieving communication with better quality of communication.

The present invention can be modified in various ways, without having to be limited to the above embodiment. For example, the cell control information transmitted by cell control information transmitter 106 to each of the base stations connected to mobile station 10 before and after the handover may be information containing the difference L between reference power value R0 and the received power value of the cell selection reference signal broadcasted by the base station as a recipient of the cell control information out of the base stations connected to mobile station 10 before and after the handover, the difference K between the uplink transmitted power value from mobile station 10 to the relevant base station and the uplink transmitted power value from mobile station 10 to the other base station, the aforementioned base station identifier, and the aforementioned cell identifier.

Each base station, receiving such cell control information, determines whether the above conditions described in the present embodiment are met by K and L in the cell control information, whereby it becomes feasible to make the size of the cell thereof substantially equal to the size of the cell of the other base station and to adjust the overlap between the cells established by the respective base stations, just as in the mobile communication system 1 of the present embodiment. Therefore, it can reduce the interference in the uplink from mobile station 10 to the base station and the interference in the downlink from the base station to mobile station 10, thus achieving communication with better quality. Since the cell control information transmitted from mobile station 10 to the base station is comprised of the information based on the differences, the volume of the cell control information becomes lower than that in the case of transmitting information of individual power values such as the uplink transmitted power values, like the cell control information in the first embodiment described above.

The cell control information, which is transmitted by cell control information transmitter 106 to each of the base stations connected to mobile station 10 before and after the handover, may also be information containing a ratio L between reference power value R0 and the received power value of the cell selection reference signal broadcasted by the base station as a recipient of the cell control information out of the base stations connected to mobile station 10 before and after the handover, a ratio K between the uplink transmitted power value from mobile station 10 to the relevant base station and the uplink transmitted power value from mobile station 10 to the other base station, the aforementioned base station identifier, and the aforementioned cell identifier. The base station, receiving such cell control information, decreases by the predetermined amount the power of the cell selection reference signal broadcasted into the cell specified by the cell identifier in the cell control information when K in the cell control information exceeds a predetermined range and when L exceeds a predetermined range. On the other hand, when K in the cell control information is below the predetermined range and when L is below the predetermined range, the base station receiving it decreases by the predetermined amount the power of the cell selection reference signal broadcasted into the cell specified by the cell identifier in the cell control information. By using the information based on the ratios of power values such as the uplink transmitted power values as described above, it is also feasible to make the size of the cell substantially equal to the cell size of the other base station and to adjust the overlap between the cells established by the base stations, just as in the mobile communication system 1 of the present embodiment. Therefore, it can reduce the interference in the uplink from mobile station 10 to the base station and the interference in the downlink from the base station to mobile station 10, thus achieving communication with better quality. Since the cell control information transmitted from mobile station 10 to the base station is comprised of the information based on the ratios, the volume thereof becomes lower than that in the case of transmitting information of individual power values such as the uplink transmitted power values, like the cell control information in the first embodiment as described above.

Second Embodiment

Figure 11:
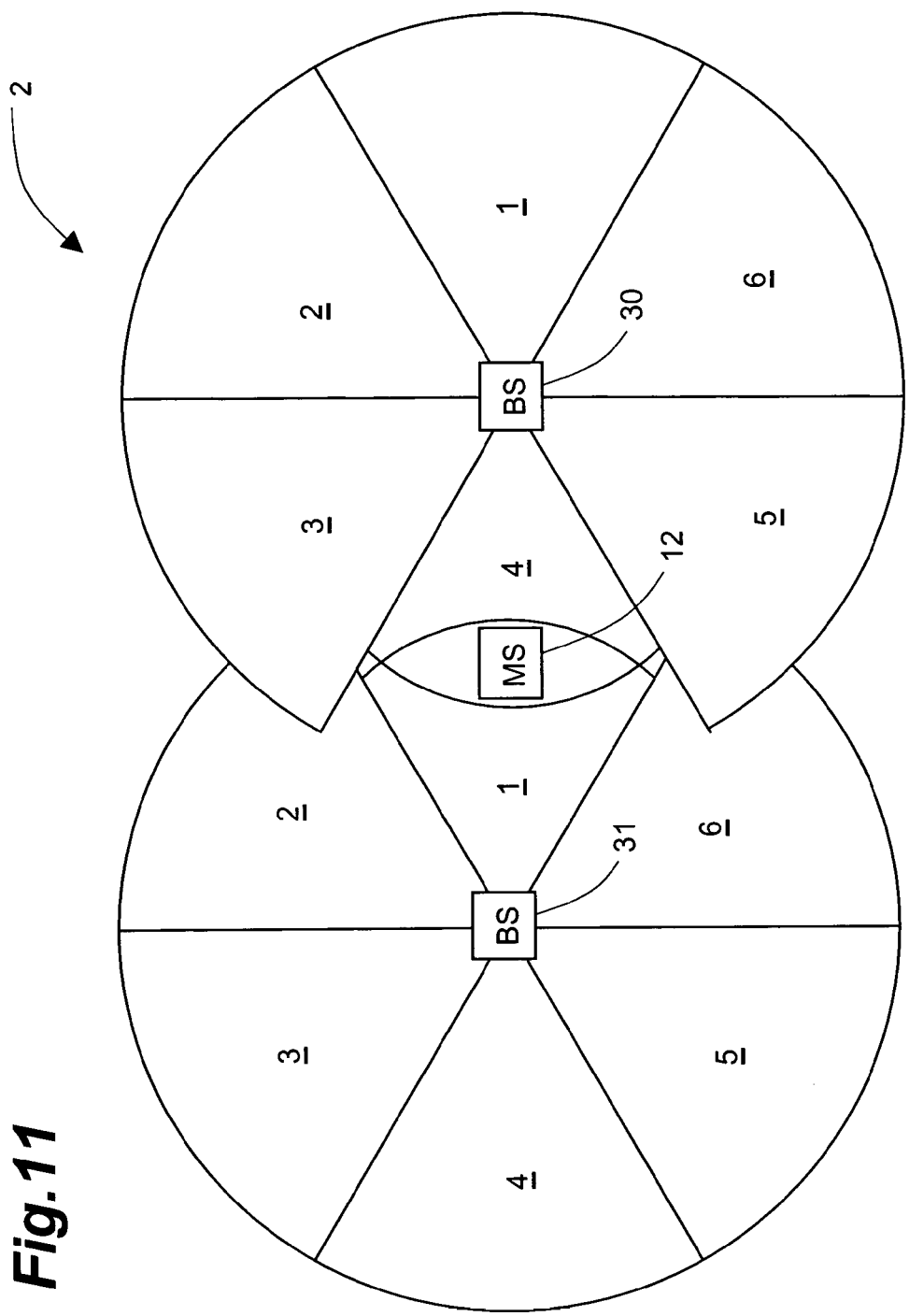
FIG. 11 is an illustration showing a configuration of a mobile communication system according to the second embodiment.

Next, mobile communication system 2 according to the second embodiment of the present invention will be described. FIG. 11 is an illustration showing the configuration of mobile communication system 2. As shown in FIG. 11, mobile communication system 2 is comprised of mobile station 12, and a plurality of base stations 30, 31, . . . (among which only base stations 30 and 31 are illustrated in FIG. 11).

Mobile station 12 performs the CDMA communication with base stations 30, 31, . . . as in the first embodiment, and the number of cells established by each base station is also similar to that in the first embodiment. Mobile station 12 and base stations 30, 31, . . . will be described below in detail.

Figure 12:
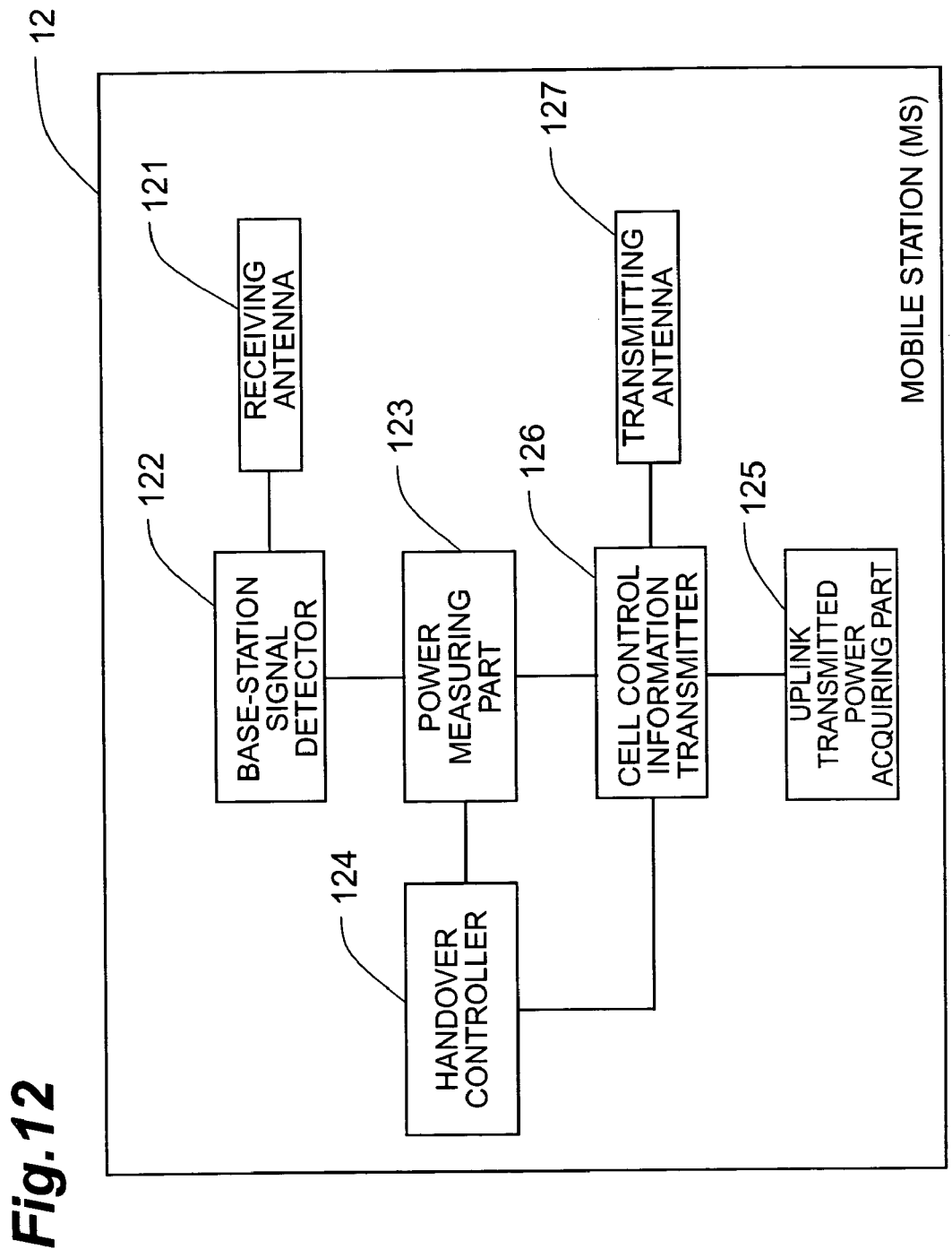
FIG. 12 is a block diagram showing a functional configuration of a mobile station according to the second embodiment.

Mobile station 12 has a physical configuration similar to that in the first embodiment. FIG. 12 is a block diagram showing the functional configuration of mobile station 12. As shown in FIG. 12, mobile station 12 is comprised of receiving antenna 121, base-station signal detector (cell selection reference receiving means) 122, power measuring part (cell selection reference received power measuring means) 123, handover controller 124, uplink power acquiring part (uplink power acquiring means) 125, cell control information transmitter (cell control information transmitting means) 126, and transmitting antenna 127. The functional components of mobile station 12 will be described below each in detail. The receiving antenna 121 and transmitting antenna 127 have configurations similar to those of receiving antenna 101 and transmitting antenna 107 described in the first embodiment. The base-station signal detector 122, power measuring part 123, handover controller 124, and uplink transmitted power acquiring part 125 also have respective configurations similar to those of the base-station signal detector 102, power measuring part 103, handover controller 104, and uplink transmitted power acquiring part 105 described in the first embodiment.

Cell control information transmitter 126 transmits the cell control information to the base stations connected to mobile station 12 before and after a handover carried out by handover controller 124, to demand a change in the size of the cell for the base station to receive this cell control information.

When mobile station 12 moves from the cell of cell identifier "1" established by base station 21 toward the cell of cell identifier "4" established by base station 20, as shown in FIG. 11, to invoke a handover by handover controller 124, cell control information transmitter 126 transmits the cell control information described below, to the base stations expected to change the size of the cell.

FIG. 13 is a diagram showing the format of the cell control information transmitted by cell control information transmitter 126. As shown in FIG. 13, the cell control information contains a base station identifier, a cell identifier, and cell change information.

The base station identifier is information specifying a base station as a recipient of this cell control information, and the cell control information shown in FIG. 13 contains the base station identifier "1" specifying the base station 20.

The cell identifier is information specifying a cell to be changed in the size of the cell by this cell control information. The cell control information shown in FIG. 13 contains the cell identifier "4" specifying the cell established by base station 20.

The cell change information is information for indicating which change, either "increase" or "decrease", should be effected on the size of the cell specified by the above cell identifier, by the base station receiving the cell control information containing this cell change information. In the example of the cell control information shown in FIG. 13, information for indicating "increase" in the size of the cell is included as cell change information.

The cell change information is defined as follows. Cell control information transmitter 126 compares the uplink transmitted power value being a transmitted power value of the radio wave of the uplink from mobile station 12 to one base station out of the base stations connected before and after the handover, with the uplink transmitted power value from mobile station 12 to the other base station. Cell control information transmitter 126 also compares the received power value of the cell selection reference signal transmitted from the above one base station, with the reference power value R0. When there is a difference between the uplink transmitted power values compared as described above and when the received power value and reference power value R0 compared as described above are substantially equal, cell control information transmitter 126 defines as cell change information, information for demanding "decrease" in the size of the cell specified by the cell identifier, out of the cells established by the base station with the greater uplink transmitted power. The base station, receiving the cell control information containing this cell change information, decreases by the predetermined amount the power of the cell selection reference signal broadcasted into the cell specified by the cell identifier in the cell control information, so as to decrease the size of the cell.

On the other hand, when there is a difference between the uplink transmitted power values compared as described above and when the received power value compared as described above is greater than the reference power value R0, cell control information transmitter 126 defines as cell change information, information for demanding "increase" in the size of the cell specified by the cell identifier, out of the cells established by the base station with the smaller uplink transmitted power. The base station, receiving the cell control information containing this cell change information, increases by the predetermined amount the power of the cell selection reference signal broadcasted into the cell specified by the cell identifier in the cell control information, so as to increase the size of the cell.

When the above conditions are not met, cell control information transmitter 126 transmits no cell control information. The cell change information made in this way may be information containing information indicating "increase" or "decrease" in the cell change information to be transmitted to each base station, so that the difference between the uplink transmitted power values to the respective base stations connected to mobile station 10 before and after the handover falls within a predetermined range and so that the difference between reference power value R0 and the received power value at mobile station 10 of the cell selection reference signal broadcasted by each of the base stations connected to mobile station 10 before and after the handover falls within a predetermined range.

Figure 14:
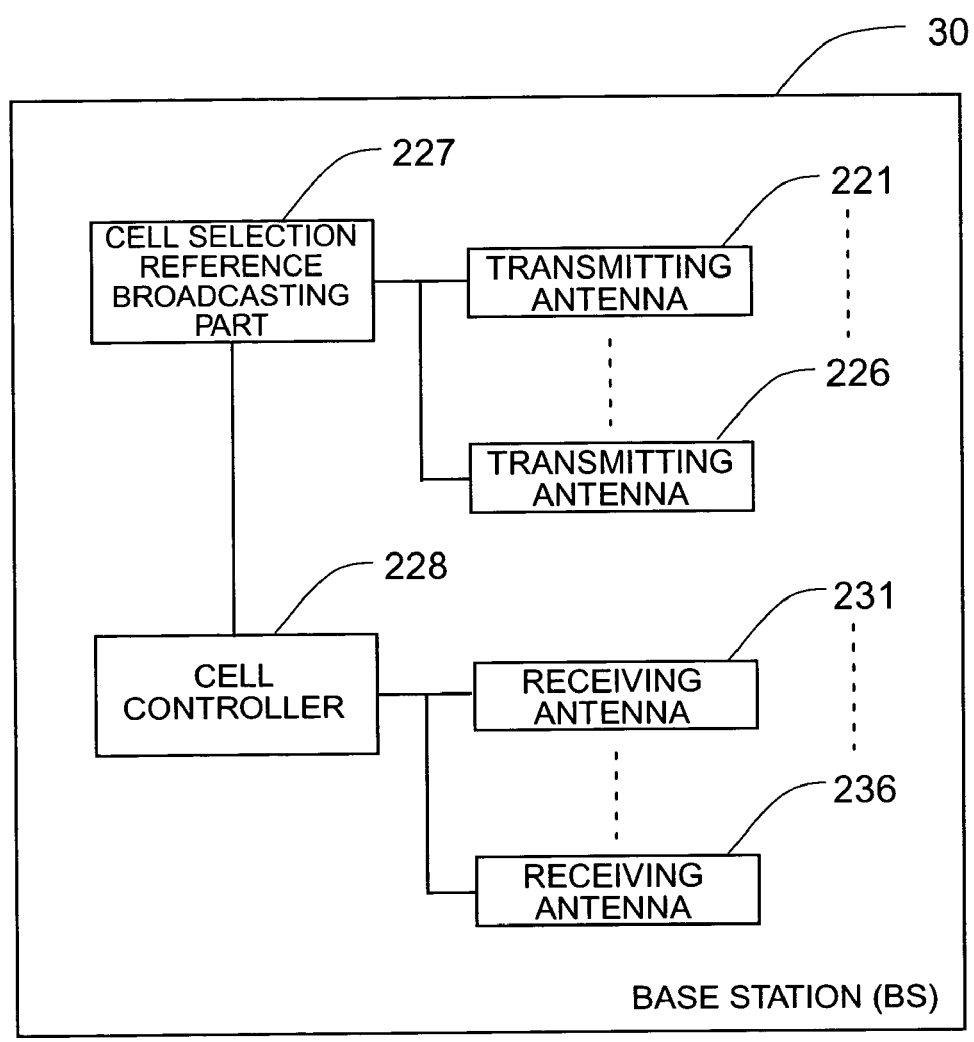
FIG. 14 is a block diagram showing a functional configuration of a base station according to the second embodiment.

Base stations 30, 31, . . . will be described below in detail. FIG. 14 is a block diagram showing the functional configuration of base station 30. The other base stations 31, . . . also have the functional configuration similar to that of base station 30. As shown in FIG. 14, base station 30 is comprised of transmitting antennas 221–226, cell selection reference signal broadcasting part (cell selection reference broadcasting means) 227, cell controller (cell controlling means) 228, and receiving antennas 231–236. The transmitting antennas 221–226 and receiving antennas 231–236 have their respective configurations similar to those of the transmitting antennas 201–206 and receiving antennas 211–216 described in the first embodiment. The cell selection reference signal broadcasting part 227 also has a configuration similar to that of cell selection reference signal broadcasting part 207 described in the first embodiment.

Cell controller 228 acquires the cell control information transmitted by mobile station 12 and received by one of receiving antennas 231–236. Cell controller 228 checks the base station identifier included in the acquired cell control information to determine whether the cell control information is one transmitted to the base station of its own. When cell controller 228 acknowledges that the acquired cell control information is one transmitted to the base station of its own, it refers to the cell identifier in the cell control information to specify the cell established by the base station of its own. Cell controller 228 changes the size of the cell specified as described above, in accordance with a demand specified by the cell change information in the cell control information.

Namely, when the cell control information contains the cell change information of the demand indicating "increase", cell controller 228 increases by the predetermined amount the power value of the cell selection reference signal broadcasted into the cell specified as described above, so as to increase the size of the cell. On the other hand, when the cell control information contains the cell change information of the demand indicating "decrease", cell controller 228 decreases by the predetermined amount the power value of the cell selection reference signal broadcasted into the cell specified as described above, so as to decrease the size of the cell.

Figure 15:
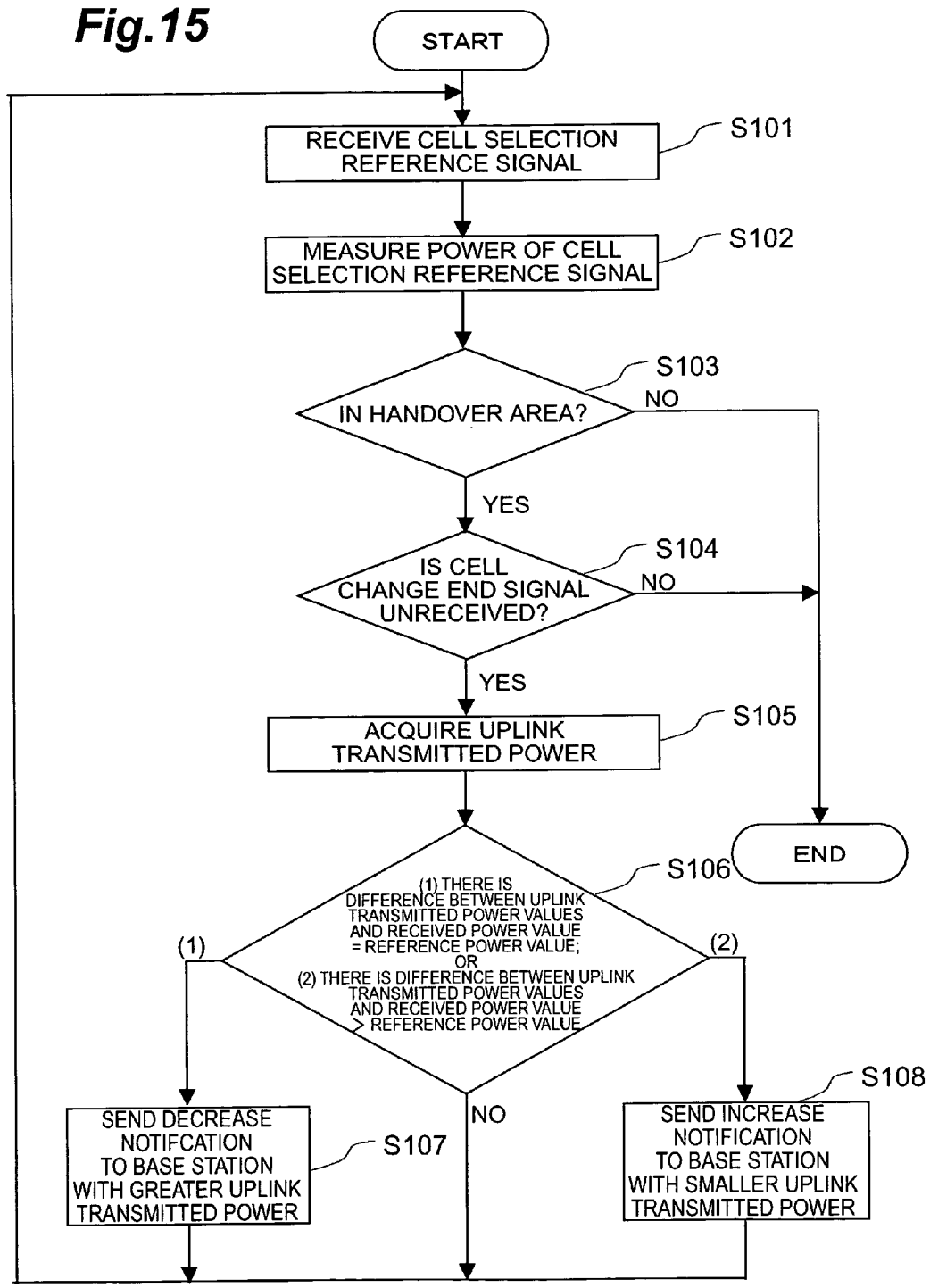
FIG. 15 is a flowchart of processing at a mobile station in a cell control method according to the second embodiment.

The cell control method by mobile communication system 2 according to the present embodiment will be described below. First, the processing at mobile station 12 in this cell control method will be described with reference to FIG. 15. FIG. 15 is a flowchart showing the processing at mobile station 12 in the cell control method according to the present embodiment. As shown in FIG. 15, mobile station 12 receives radio waves transmitted from base stations forming their respective cells at it present location, through receiving antenna 121. Then the base-station signal detector 122 detects the cell selection reference signal or the cell change end notification from the radio waves received through receiving antenna 121 (step S101).

Next, power measuring part 123 measures power values of the cell selection reference signals detected by base-station signal detector 122 (step S102). Based on the power values measured by power measuring part 123, the handover controller 124 then determines whether the received power value of the cell selection reference signal from the other base station becomes larger than the received power value of the cell selection reference signal from the base station presently under connection, and thereby determines whether mobile station 12 is located in a handover area (step S103).

When the result of this determination is that the received power value of the cell selection reference signal from the base station presently under connection is not less than the received power value of the cell selection reference signal from the other base station, handover controller 124 terminates the processing without switching of the base station to be connected.

On the other hand, when the received power value of the cell selection reference signal from the other base station becomes larger than the received power value of the cell selection reference signal from the base station presently under connection, handover controller 124 effects a handover. The handover controller 124 also instructs the cell control information transmitter 126 to transmit the cell control information to the base stations connected before and after the handover.

On the basis of this instruction, cell control information transmitter 126 determines whether base-station signal detector 122 has detected a cell change end notification transmitted from the base stations connected before and after the above handover (step S104).

When the result of this determination is that base-station signal detector 122 has already received the above cell change end notification, cell control information transmitter 126 terminates the processing. On the other hand, if base-station signal detector 122 has detected no cell change end notification yet, cell control information transmitter 126 acquires the uplink transmitted powers from mobile station 12 to the respective base stations connected before and after the handover (step S105), which were stored by uplink transmitted power acquiring part 125.

Cell control information transmitter 126 compares the uplink transmitted power value being a transmitted power value of the radio wave of the uplink from mobile station 12 to one of the base stations connected before and after the handover, with the uplink transmitted power value from mobile station 12 to the other base station. Cell control information transmitter 126 also compares the received power value of the cell selection reference signal transmitted from the above one base station, with the reference power value R0. In these comparisons, the cell control information transmitter 126 determines whether Condition (1): there is a difference between the uplink transmitted power values compared as described above and the received power value compared as described above is substantially equal to the reference power value R0, is met; or whether Condition (2): there is a difference between the uplink transmitted power values compared as described above and the received power value compared as described above is larger than the reference power value R0, is met (step S106). When the result of this determination is that Condition (1) is met, cell control information transmitter 126 generates the cell control information containing the cell change information as information for demanding "decrease" in the size of the cell specified by the cell identifier, out of the cells established by the base station with the larger uplink transmitted power, and transmits this cell control information to the above base station with the larger uplink transmitted power (step S107).

On the other hand, when the result of this determination is that Condition (2) is met, cell control information transmitter 126 generates the cell control information containing the cell change information as information for demanding "increase" in the size of the cell specified by the cell identifier, out of the cells established by the base station with the smaller uplink transmitted power, and transmits this cell control information to the above base station with the smaller uplink transmitted power (step S108). When the both conditions (1) and (2) are not met, cell control information transmitter 126 transmits no cell control information.

Mobile station 12 repeats the above processing.

Figure 16:
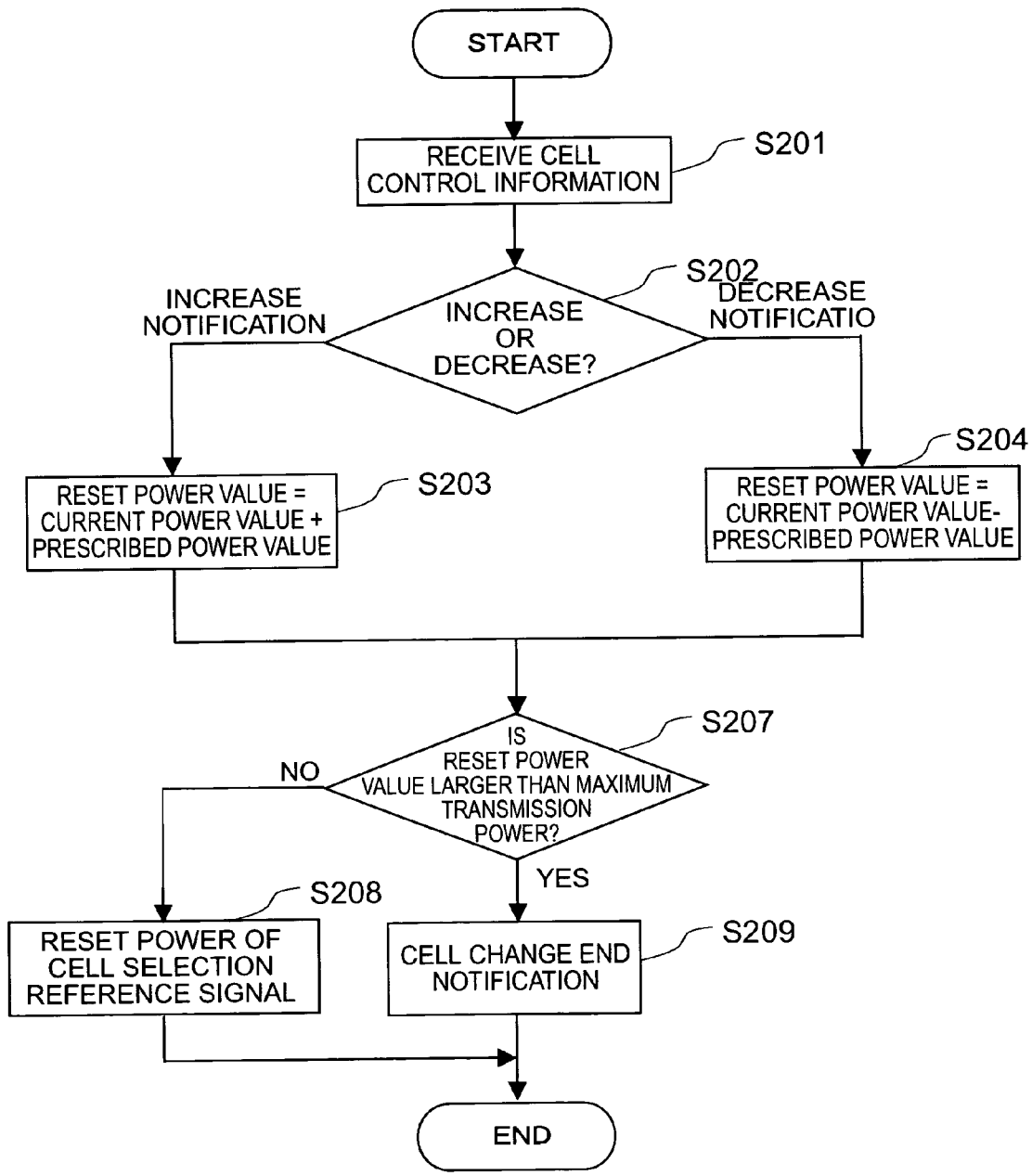
FIG. 16 is a flowchart showing processing at a base station in a cell control method according to the second embodiment.

The processing at base stations 30, 31, . . . in the cell control method according to the present embodiment will be described below with reference to FIG. 16. FIG. 16 is a flowchart of the processing executed at base stations 30, 31, . . . in the cell control method according to the present embodiment. As shown in FIG. 16, cell controller 228 of each of the base stations connected to mobile station 12 before and after the handover receives the cell control information transmitted from mobile station 12 (step S201).

Cell controller 228 determines whether the cell change information in the received cell control information is information demanding "increase" in the size of the cell or information demanding "decrease" (step S202).

When the result of the determination is that the cell change information is information demanding "increase" in the size of the cell, cell controller 228 adds a prescribed power value to the current power value of the cell selection reference signal broadcasted into the cell specified by the cell identifier in the above cell control information and established by the base station of its own, to obtain a reset power value (step S203).

On the other hand, when the cell change information is information demanding "decrease" in the size of the cell, cell controller 228 subtracts a prescribed power value from the current power value of the cell selection reference signal broadcasted into the cell specified by the cell identifier in the above cell control information and established by the base station of its own, to obtain a reset power value (step S204).

Cell controller 228 determines whether the reset power value calculated in this way is greater than a maximum that can be set as a transmitted power value of the cell selection reference signal (step S207). When the result of this determination is that the above reset power value is not more than the maximum that can be set as a transmitted power value of the cell selection reference signal, cell controller 228 resets the power value of the cell selection reference signal broadcasted into the cell specified by the cell identifier in the cell control information, to the above reset power value (step S208). On the other hand, when the reset power value is larger than the above maximum transmitted power, cell controller 228 transmits the aforementioned cell change end notification to mobile station 12.

The action and effect of mobile communication system 2 according to the present embodiment will be described below. In mobile communication system 2 of the present embodiment, concerning the cells established by the base stations connected before and after the handover, mobile station 12 generates the cell control information containing the cell change information indicating the demand of increase or decrease in the size of these cells, under the aforementioned conditions. Mobile station 12 transmits this cell control information to the base station forming the cell to be changed in the size of the cell.

The base station refers to the cell change information in the cell control information transmitted by mobile station 12 and controls the transmitted power of the cell selection reference signal broadcasted into the cell specified by the cell identifier in the cell control information, so as to change the size of the cell. In this way, the transmitted power values of the cell selection reference signals to be broadcasted into the respective cells where mobile station 12 is located before and after the handover, are made substantially equal, as in the mobile communication system 1 described in the first embodiment. As a consequence, it is feasible to equalize the sizes of the respective cells where the mobile station 12 is located before and after the handover. The powers of the cell selection reference signals broadcasted from the respective base stations are controlled so that the received power values of the cell selection reference signals received before and after the handover by mobile station 12 become substantially equal to the reference power value R0. As a result, the overlap is adjusted in the boundary region between the cells established by the base stations connected to mobile station 12 before and after the handover.

Since the cell control information transmitted from mobile station 12 to the base stations is comprised of only the base station identifier, the cell identifier, and the cell change information, the volume of the cell control information becomes lower than that of the cell control information transmitted from mobile station 10 in the first embodiment.

Furthermore, the base stations merely need to control the increase or decrease in the size of the cell in accordance with the cell change information in the cell control information transmitted from mobile station 12, and the load of processing on the base stations is thus lighter than that of the processing on the base stations in the first embodiment.

The principle of the present invention was illustrated and described in the preferred embodiments, but it is noted that the present invention embraces all changes in locations and details without departing from the principle, as understood by those skilled in the art. The present invention is by no means intended to be limited to the specific configurations disclosed in the embodiments thereof. Therefore, the Inventor claims all modifications and changes falling within the scope of claims and within the scope of the spirit of the invention.

What is claimed is:

1. A mobile communication system comprising a mobile station and a plurality of base stations,
wherein the mobile station comprises:
cell selection reference receiving means for, on the occasion of a handover from a first base station to a second base station as a base station for the mobile station to be connected, receiving a first cell selection reference signal from the first base station and a second cell selection reference signal from the second base station out of cell selection reference signals broadcasted by the respective base stations, each cell selection reference signal containing identification information for identification of a base station and a cell established by the base station;
cell selection reference received power measuring means for measuring received power values of the first and second cell selection reference signals received by the cell selection reference receiving means;
uplink transmitted power acquiring means for acquiring a first uplink transmitted power value and a second uplink transmitted power value, which are transmitted powers of respective uplinks from the mobile station to the first base station and to the second base station; and
cell control information transmitting means for transmitting to the first base station, first cell control information based on at least the received power value of the first cell selection reference signal, the first and second uplink transmitted power values, and the first identification information included in the first cell selection reference signal, and for transmitting to the second base station, second cell control information based on at least the received power value of the second cell selection reference signal, the first and second uplink transmitted power values, and the second identification information included in the second cell selection reference signal; and wherein each of the base stations comprises:
cell selection reference broadcasting means for broadcasting the cell selection reference signal; and
cell controlling means for acquiring the cell control information transmitted to the relevant base station by the cell control information transmitting means of the mobile station and for, based on the cell control information, controlling a power of the cell selection reference signal broadcasted by the cell selection reference broadcasting means into the cell established by the relevant base station specified by the identification information in the cell control information, so that the first and second uplink transmitted power values become substantially equal and so that a received power value at the mobile station of the cell selection reference signal broadcasted by the relevant base station becomes substantially equal to a predetermined reference power value.

2. A base station in a mobile communication system, comprising:
cell selection reference broadcasting means for broadcasting a cell selection reference signal containing identification information for identification of the base station and a cell established by the base station; and
cell controlling means configured as follows: in the case of said base station being one of a first base station and a second base station for a mobile station to be connected before and after a handover, the cell controlling means acquires one cell control information out of first cell control information transmitted to the first base station by the mobile station on the basis of at least a received power value at the mobile station of the cell selection reference signal broadcasted by the first base station, first and second uplink transmitted power values from the mobile station to the first base station and to the second base station, and first identification information in the first cell selection reference signal, and second cell control information transmitted to the second base station by the mobile station on the basis of at least a received power value at the mobile station of the cell selection reference signal broadcasted by the second base station, the first and second uplink transmitted power values, and second identification information in the second cell selection reference signal; and the cell controlling means controls a power of the cell selection reference signal broadcasted by the cell selection reference broadcasting means into the cell established by the relevant base station specified by the identification information in the one cell control information, so that the first and second uplink transmitted power values become substantially equal and so that the received power value at the mobile station of the cell selection reference signal broadcasted by the relevant base station becomes substantially equal to a predetermined reference power value, based on the one cell control information.

3. The base station according to claim 2, said base station establishing a plurality of cells, and
wherein the cell selection reference broadcasting means of said base station broadcasts into each cell established by said base station, the cell selection reference signal containing the identification information with a base station identifier for identification of the base station and a cell identifier for identification of the cell.

4. The base station according to claim 2, wherein, in the case of said base station being one of the first and second base stations, the cell controlling means acquires one cell control information out of the first cell control information containing the received power value of the first cell selection reference signal, the first and second uplink transmitted power values, and the first identification information and transmitted to the first base station by the mobile station, and the second cell control information containing the received power value of the second cell selection reference signal, the first and second uplink transmitted power values, and the second identification information and transmitted to the second base station by the mobile station.

5. The base station according to claim 4, wherein the cell controlling means is configured as follows: in the case of said base station being one of the first and second base stations, based on the cell control information transmitted by the mobile station,
the cell controlling means decreases by a predetermined amount the power of the cell selection reference signal broadcasted by the cell selection reference broadcasting means into the cell established by the relevant base station specified by the identification information in the cell control information when it is determined that the uplink transmitted power value to the relevant base station out of the first and second uplink transmitted power values is larger than the uplink transmitted power value to the other base station out of the first and second uplink transmitted power values and that the received power value at the mobile station of the cell selection reference signal transmitted by the relevant base station is larger than the predetermined reference power value; and
the cell controlling means increases by a predetermined amount the power of the cell selection reference signal broadcasted by the cell selection reference broadcasting means into the cell established by the relevant base station specified by the identification information in the cell control information when it is determined that the uplink transmitted power value to the relevant base station out of the first and second uplink transmitted power values is smaller than the uplink transmitted power value to the other base station out of the first and second uplink transmitted power values and that the received power value at the mobile station of the cell selection reference signal transmitted by the relevant base station is not more than the predetermined reference power value.

6. The base station according to claim 2, wherein the cell controlling means acquires one cell control information out of the first cell control information containing a first received power value difference being a difference between the predetermined reference power value and the received power value of the first cell selection reference signal, a transmitted power value difference about a difference between the first uplink transmitted power value and the second uplink transmitted power value, and the first identification information and transmitted to the first base station by the mobile station, and the second cell control information containing a second received power value difference being a difference between the predetermined reference power value and the received power value of the second cell selection reference signal, the transmitted power value difference, and the second identification information and transmitted to the second base station by the mobile station.

7. The base station according to claim 6, wherein the cell controlling means is configured as follows:
in the case of said base station being one of the first and second base stations, the cell controlling means acquires the cell control information transmitted by the cell control information transmitting means of the mobile station;

when it is determined that the uplink transmitted power value to the relevant base station is larger than the uplink transmitted power value to the other base station out of the first and second uplink transmitted power values, based on the transmitted power value difference in the cell control information, and that the received power value at the mobile station of the cell selection reference signal transmitted by the relevant base station is larger than the predetermined reference power value, based on the received power value difference in the cell control information, the cell controlling means decreases by a predetermined amount the power of the cell selection reference signal broadcasted by the cell selection reference broadcasting means into the cell established by the relevant base station specified by the identification information in the cell control information; and when it is determined that the uplink transmitted power value to the relevant base station is smaller than the uplink transmitted power value to the other base station out of the first and second uplink transmitted power values, based on the transmitted power value difference in the cell control information, and that the received power value at the mobile station of the cell selection reference signal transmitted by the relevant base station is not more than the predetermined reference power value, based on the received power value difference in the cell control information, the cell controlling means increases by a predetermined amount the power of the cell selection reference signal broadcasted by the cell selection reference broadcasting means into the cell established by the relevant base station specified by the identification information in the cell control information.

8. The base station according to claim 2, wherein the cell controlling means acquires one cell control information out of the first cell control information containing a first received power value ratio being a ratio between the predetermined reference power value and the received power value of the first cell selection reference signal, a transmitted power value ratio about a ratio between the first uplink transmitted power value and the second uplink transmitted power value, and the first identification information and transmitted to the first base station by the mobile station, and the second cell control information containing a second received power value ratio being a ratio between the predetermined reference power value and the received power value of the second cell selection reference signal, the transmitted power value ratio, and the second identification information and transmitted to the second base station by the mobile station.

9. The base station according to claim 8, wherein the cell controlling means is configured as follows:

in the case of said base station being one of the first and second base stations, the cell controlling means acquires the cell control information transmitted by the cell control information transmitting means of the mobile station;

when it is determined that the uplink transmitted power value to the relevant base station is larger than the uplink transmitted power value to the other base station out of the first and second uplink transmitted power values, based on the transmitted power value ratio in the cell control information, and that the received power value at the mobile station of the cell selection reference signal transmitted by the relevant base station is larger than the predetermined reference power value, based on the received power value ratio in the cell control information, the cell controlling means decreases by a predetermined amount the power of the cell selection reference signal broadcasted by the cell selection reference broadcasting means into the cell established by the relevant base station specified by the identification information in the cell control information; and when it is determined that the uplink transmitted power value to the relevant base station is smaller than the uplink transmitted power value to the other base station out of the first and second uplink transmitted power values, based on the transmitted power value ratio in the cell control information, and that the received power value at the mobile station of the cell selection reference signal transmitted by the relevant base station is not more than the predetermined reference power value, based on the received power value ratio in the cell control information, the cell controlling means increases by a predetermined amount the power of the cell selection reference signal broadcasted by the cell selection reference broadcasting means into the cell established by the relevant base station specified by the identification information in the cell control information.

10. The base station according to claim 2, wherein the cell controlling means is configured as follows:

when said base station is one of the first and second base stations, when the received power value at the mobile station of the cell selection reference signal transmitted by the relevant base station is larger than the predetermined reference power value, and when the uplink transmitted power value from the mobile station to the relevant base station is larger than the uplink transmitted power value to the other base station out of the first and second base stations, the cell controlling means acquires the cell control information transmitted by the mobile station and containing cell change information for demanding a decrease in a size of the cell established by the relevant base station specified by the identification information in the cell selection reference signal transmitted by the relevant base station, and the identification information in the cell selection reference signal transmitted by the relevant base station;

when the relevant base station is one of the first and second base stations, when the received power value at the mobile station of the cell selection reference signal transmitted by the relevant base station is smaller than the predetermined reference power value, and when the uplink transmitted power value from the mobile station to the relevant base station is not more than the uplink transmitted power value to the other base station out of the first and second base stations, the cell controlling means acquires the cell control information transmitted by the mobile station and containing cell change information for demanding an increase in the size of the cell established by the relevant base station specified by the identification information in the cell selection reference signal transmitted by the relevant base station, and the identification information in the cell selection reference signal transmitted by the relevant base station; and when the cell change information in the cell control information is one for demanding a decrease in the size of the cell, the cell controlling means decreases by a predetermined amount the power of the cell selection reference signal broadcasted by the cell selection reference broadcasting means into the cell established by the relevant base station specified by the identification information in the cell control information; and when the cell change information in the cell control information is one for demanding an increase in the size of the cell, the cell controlling means increases by a predetermined amount the power of the cell selection reference signal broadcasted by the cell selection reference broadcasting means into the cell established by the relevant base station specified by the identification information in the cell control information.

11. A mobile station in a mobile communication system comprising a plurality of base stations, the mobile station comprising:

cell selection reference receiving means for, on the occasion of a handover from a first base station to a second base station as a base station for the mobile station to be connected, receiving a first cell selection reference signal from the first base station and a second cell selection reference signal from the second base station out of cell selection reference signals broadcasted by the respective base stations, each cell selection reference signal containing identification information for identification of a base station and a cell established by the base station;

cell selection reference received power measuring means for measuring received power values of the first and second cell selection reference signals received by the cell selection reference receiving means;

uplink transmitted power acquiring means for acquiring a first uplink transmitted power value and a second uplink transmitted power value, which are transmitted powers of respective uplinks from the mobile station to the first base station and to the second base station; and cell control information transmitting means for transmitting to the first base station, first cell control information based on at least the received power value of the first cell selection reference signal, the first and second uplink transmitted power values, and the first identification information included in the first cell selection reference signal, and for transmitting to the second base station, second cell control information based on at least the received power value of the second cell selection reference signal, the first and second uplink transmitted power values, and the second identification information included in the second cell selection reference signal.

12. The mobile station according to claim 11, wherein the cell control information transmitting means transmits to the first base station the first cell control information containing the received power value of the first cell selection reference signal, the first and second uplink transmitted power values, and the first identification information and transmits to the second base station the second cell control information containing the received power value of the second cell selection reference signal, the first and second uplink transmitted power values, and the second identification information.

13. The mobile station according to claim 11, wherein the cell control information transmitting means transmits to the first base station the first cell control information containing a first received power value difference being a difference between a predetermined reference power value and the received power value of the first cell selection reference signal, a transmitted power value difference about a difference between the first uplink transmitted power value and the second uplink transmitted power value, and the first identification information, and transmits to the second base station the second cell control information containing a second received power value difference being a difference between a predetermined reference power value and the received power value of the second cell selection reference signal, the transmitted power value difference, and the second identification information.

14. The mobile station according to claim 11, wherein the cell control information transmitting means transmits to the first base station the first cell control information containing a first received power value ratio being a ratio between a predetermined reference power value and the received power value of the first cell selection reference signal, a transmitted power value ratio about a ratio between the first uplink transmitted power value and the second uplink transmitted power value, and the first identification information, and transmits to the second base station the second cell control information containing a second received power value ratio being a ratio between the predetermined reference power value and the received power value of the second cell selection reference signal, the transmitted power value ratio, and the second identification information.

15. The mobile station according to claim 11, wherein the cell control information transmitting means is configured as follows:

when the received power value of the cell selection reference signal transmitted by one base station out of the first base station and the second base station is larger than a predetermined reference power value and when the uplink transmitted power value to the one base station is larger than the uplink transmitted power value to the other base station out of the first base station and the second base station, the cell control information transmitting means transmits to the one base station the cell control information in which the identification information in the cell selection reference signal transmitted by the one base station is correlated with cell change information for demanding a decrease in a size of the cell established by the one base station specified by the identification information in the cell selection reference signal transmitted by the one base station; and when the received power value of the cell selection reference signal transmitted by the one base station is smaller than the predetermined reference power value and when the uplink transmitted power value to the one base station is not more than the uplink transmitted power value to the other base station, the cell control information transmitting means transmits to the one base station the cell control information in which the identification information in the cell selection reference signal transmitted by the one base station is correlated with cell change information for demanding an increase in the size of the cell established by the one base station specified by the identification information in the cell selection reference signal transmitted by the one base station.

16. A cell control method of controlling cells established by respective base stations, the cell control method comprising:

a cell selection reference broadcasting step wherein cell selection reference broadcasting means of each of the base stations broadcasts a cell selection reference signal containing identification information for identification of the base station and a cell established by the base station;

a cell selection reference signal receiving step wherein, on the occasion of a handover from a first base station to a second base station as a base station for a mobile station to be connected, cell selection reference receiving means of the mobile station receives a first cell selection reference signal from the first base station and a second cell selection reference signal from the second base station out of the cell selection reference signals broadcasted by the respective base stations;

a cell selection reference received power measuring step wherein cell selection reference received power measuring means of the mobile station measures received power values of the first and second cell selection reference signals received by the cell selection reference receiving means;

an uplink transmitted power acquiring step wherein uplink transmitted power acquiring means of the mobile station acquires a first uplink transmitted power value and a second uplink transmitted power value, which are transmitted powers of respective uplinks from the mobile station to the first base station and to the second base station;

a cell control information transmitting step wherein cell control information transmitting means of the mobile station transmits to the first base station, first cell control information based on at least the received power value of the first cell selection reference signal, the first and second uplink transmitted power values, and the first identification information included in the first cell selection reference signal, and transmits to the second base station, second cell control information based on at least the received power value of the second cell selection reference signal, the first and second uplink transmitted power values, and the second identification information included in the second cell selection reference signal; and a cell control step wherein cell controlling means of each of the base stations acquires the cell control information transmitted to the relevant base station by the cell control information transmitting means of the mobile station and, based on the cell control information, controls a power of the cell selection reference signal broadcasted by the cell selection reference broadcasting means into the cell established by the relevant base station specified by the identification information in the cell control information, so that the first and second uplink transmitted power values become substantially equal and so that a received power value at the mobile station of the cell selection reference signal broadcasted by the relevant base station becomes substantially equal to a predetermined reference power value.

* * * * *